(12) United States Patent
Fahimi et al.

(10) Patent No.: US 11,909,264 B2
(45) Date of Patent: Feb. 20, 2024

(54) ROTOR CONFIGURATION FOR SWITCHED RELUCTANCE MOTOR WITH MINIMIZED TORQUE RIPPLE

(71) Applicant: Board of Regents, The University of Texas System, Austin, TX (US)

(72) Inventors: Babak Fahimi, Plano, TX (US); Seyed Ehsan Movahed Mohammadi, Richardson, TX (US); Mehdi Moallem, Plano, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 273 days.

(21) Appl. No.: 17/305,761

(22) Filed: Jul. 14, 2021

(65) Prior Publication Data

US 2022/0021253 A1 Jan. 20, 2022

Related U.S. Application Data

(60) Provisional application No. 62/705,751, filed on Jul. 14, 2020.

(51) Int. Cl.
*H02K 1/24* (2006.01)
*H02K 1/14* (2006.01)
*H02K 19/10* (2006.01)

(52) U.S. Cl.
CPC .............. *H02K 1/246* (2013.01); *H02K 1/14* (2013.01); *H02K 19/10* (2013.01); *H02K 2213/03* (2013.01)

(58) Field of Classification Search
CPC .......... H02K 1/14; H02K 1/246; H02K 19/10; H02K 2213/03; H02K 29/03; G01V 1/005; G01V 1/32; G01V 1/36; G01V 1/375; G01V 1/38; G01V 2210/26; Y02E 10/56

See application file for complete search history.

(56) References Cited

U.S. PATENT DOCUMENTS

| 9,106,122 | B2 * | 8/2015 | Fahimi | .................... | H02K 19/06 |
| 2002/0175584 | A1 * | 11/2002 | Koharagi | .............. | H02K 1/2766 |
| | | | | | 310/156.56 |
| 2011/0012464 | A1 * | 1/2011 | Lee | ......................... | H02K 1/276 |
| | | | | | 310/216.106 |
| 2016/0049835 | A1 * | 2/2016 | Fukumoto | ............ | H02K 19/103 |
| | | | | | 310/46 |
| 2017/0047821 | A1 * | 2/2017 | Klassen | ................... | H02K 5/04 |
| 2019/0181702 | A1 * | 6/2019 | Gieras | .................... | H02K 1/246 |

* cited by examiner

*Primary Examiner* — Naishadh N Desai

(74) *Attorney, Agent, or Firm* — Schultz & Associates, P.C.

(57) ABSTRACT

A hybrid switched reluctance motor is provided that reduces torque ripple. A novel rotor design includes flux barriers. The flux barriers are positioned and shaped to create implicit saliency and reluctance torque for the motor. A gradual change in the motor reluctance results which avoids rapid increases in flux density. The rotor also increases efficiency by reducing acoustical and vibrational responses and associated energy loses.

13 Claims, 20 Drawing Sheets

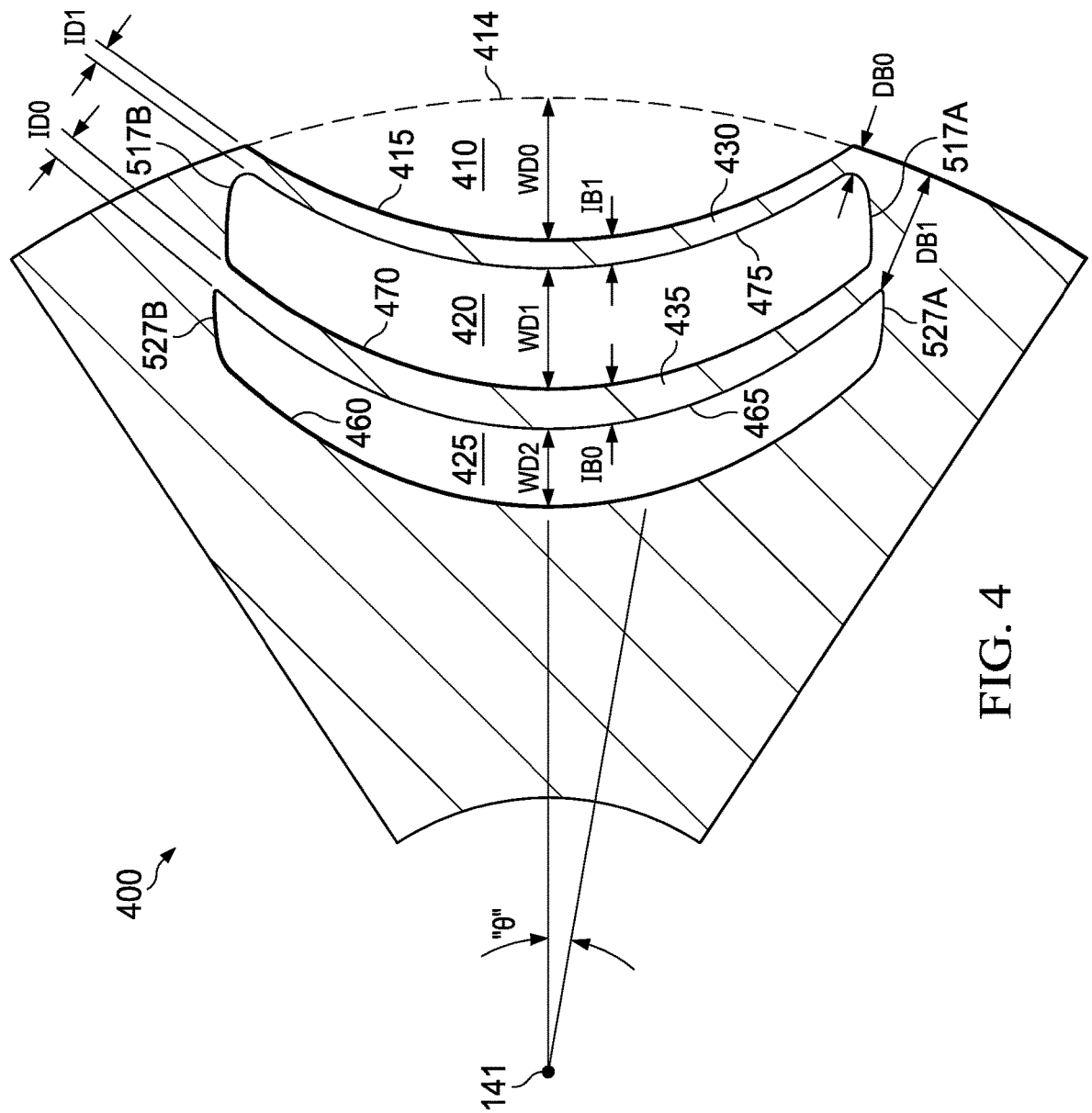

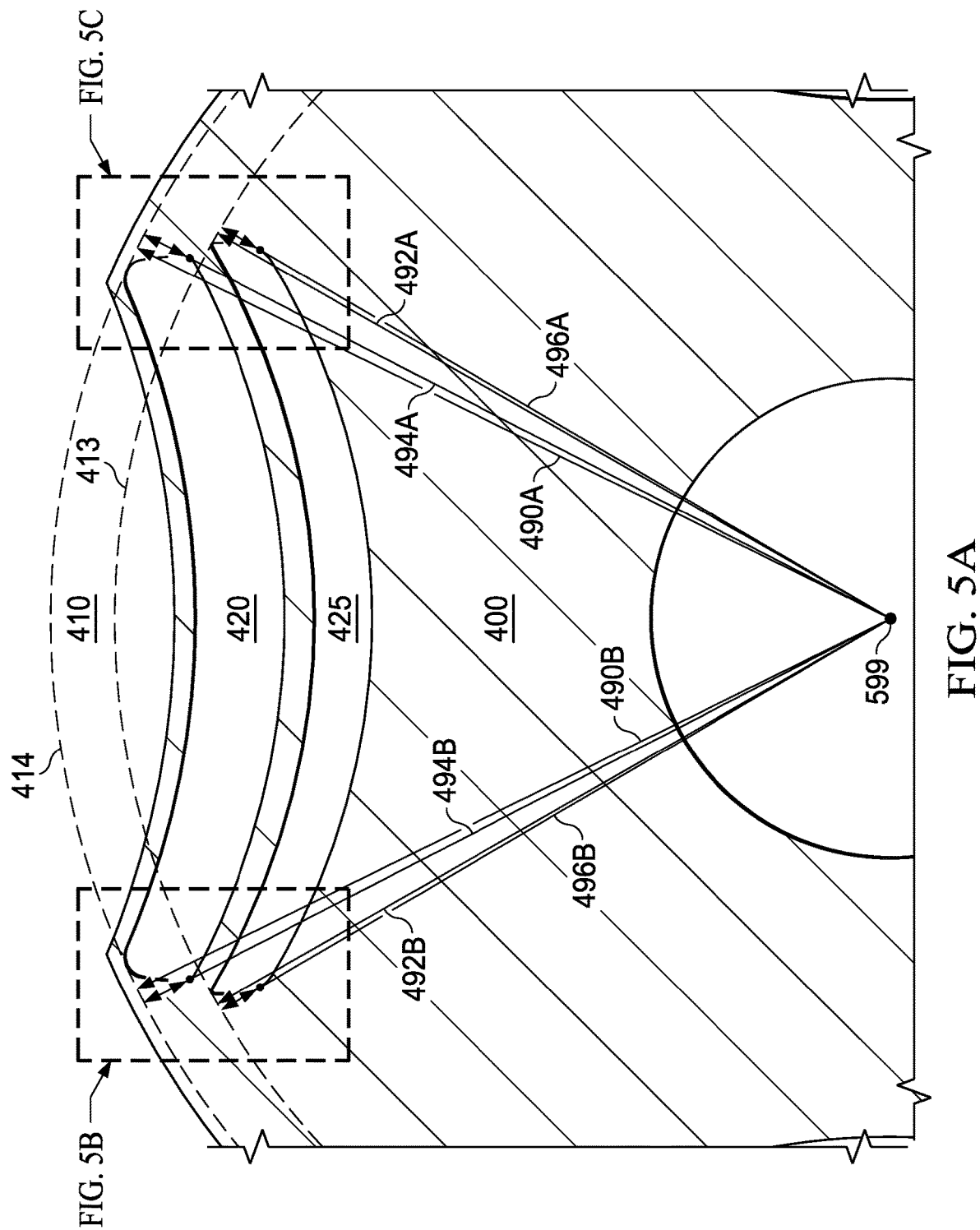

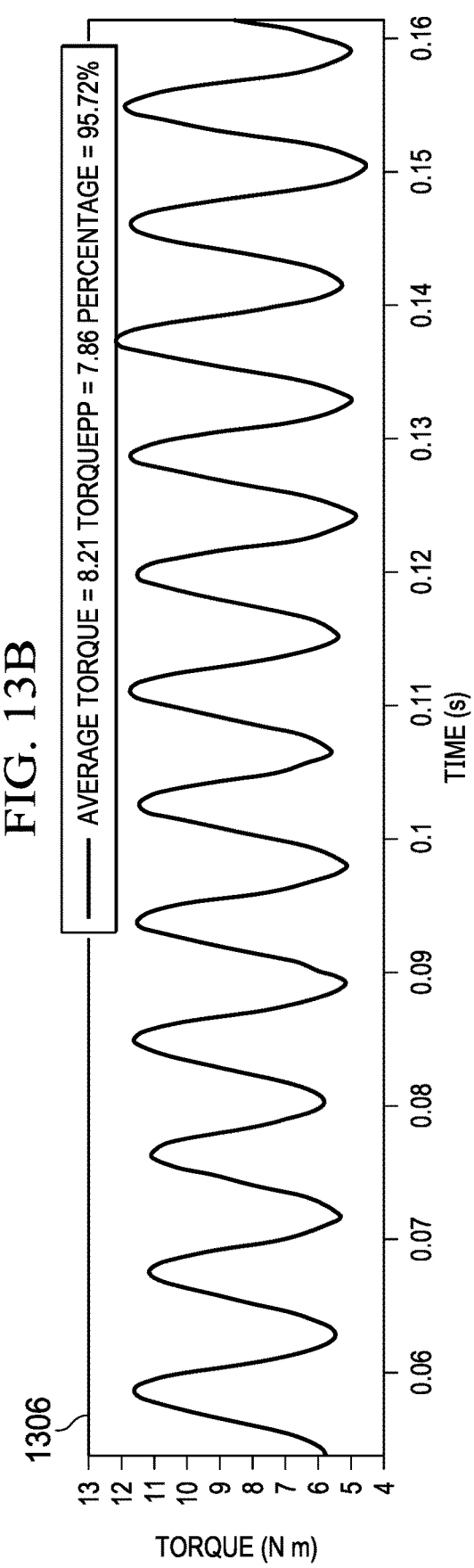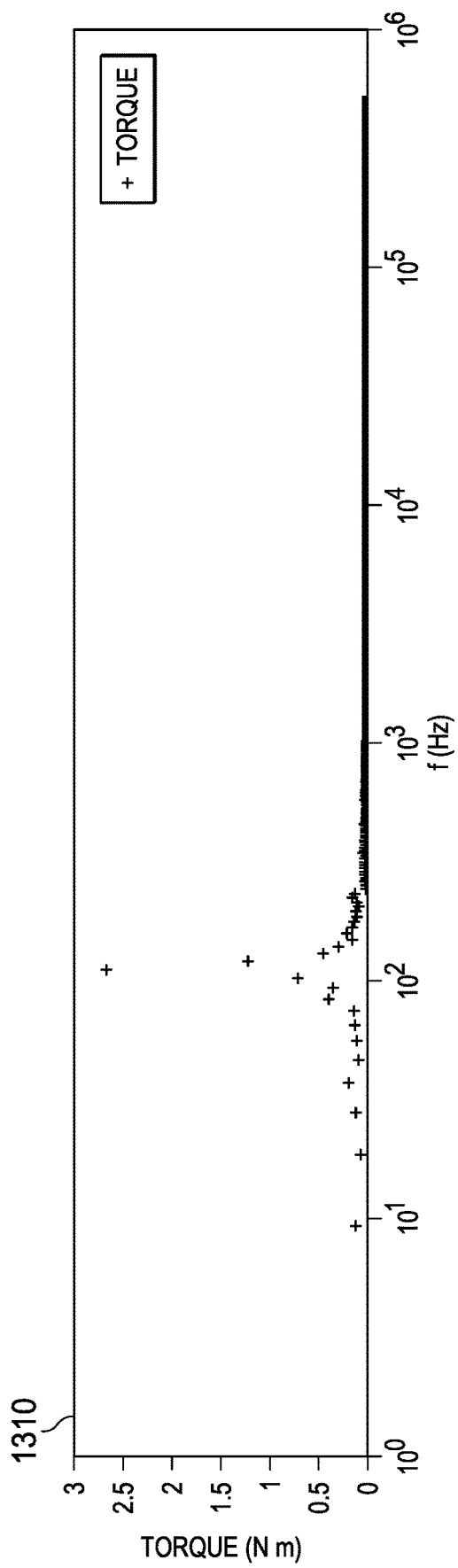
FIG. 13B

FIG. 14A
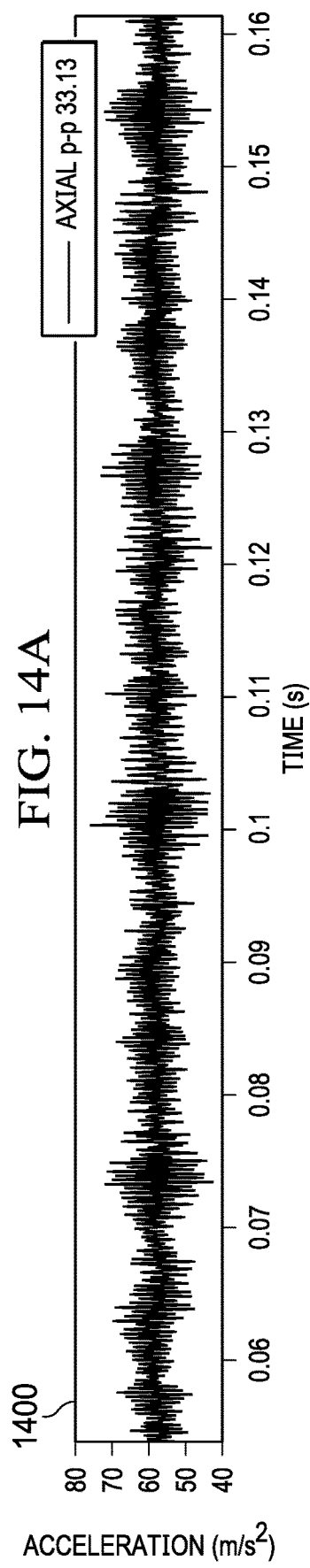
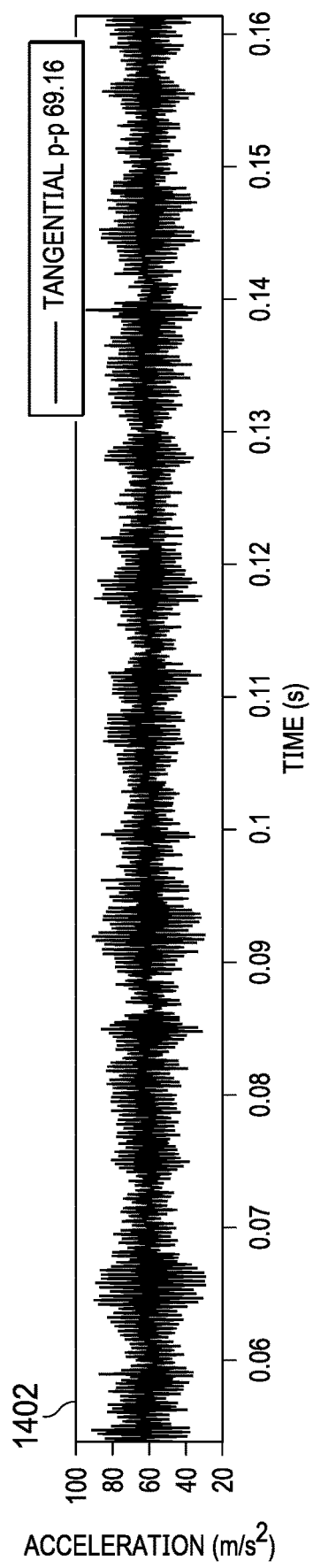
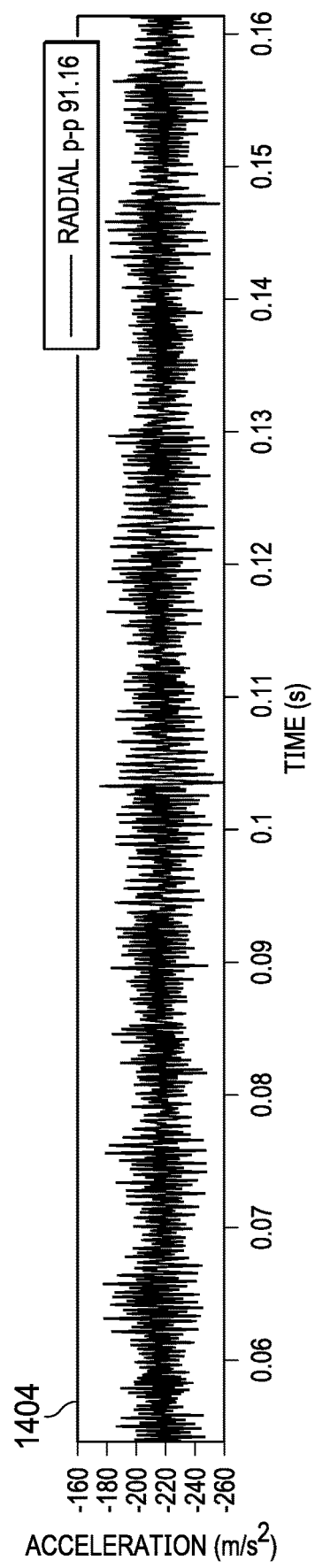

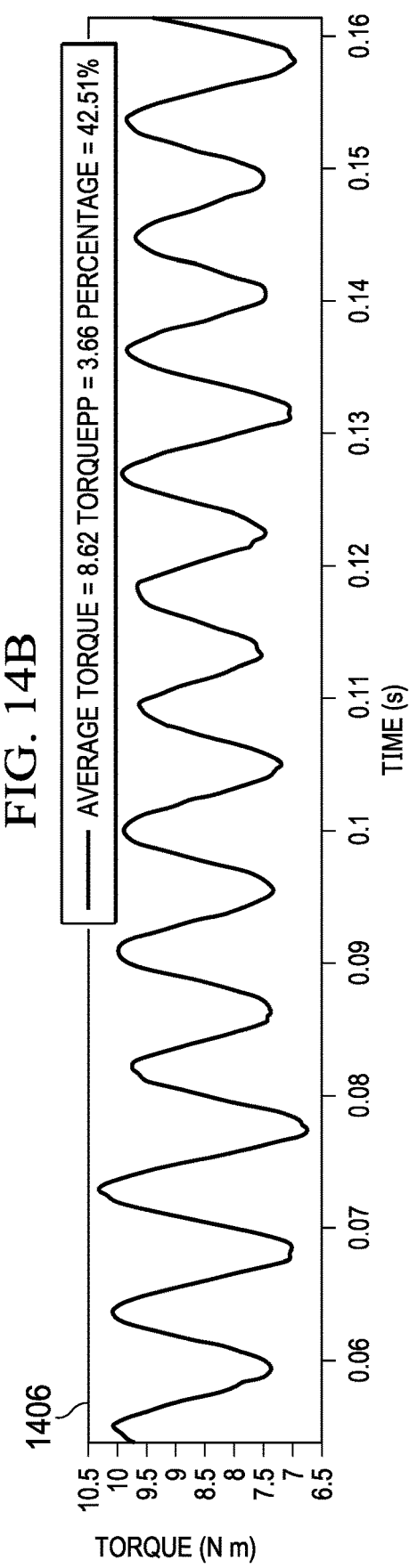
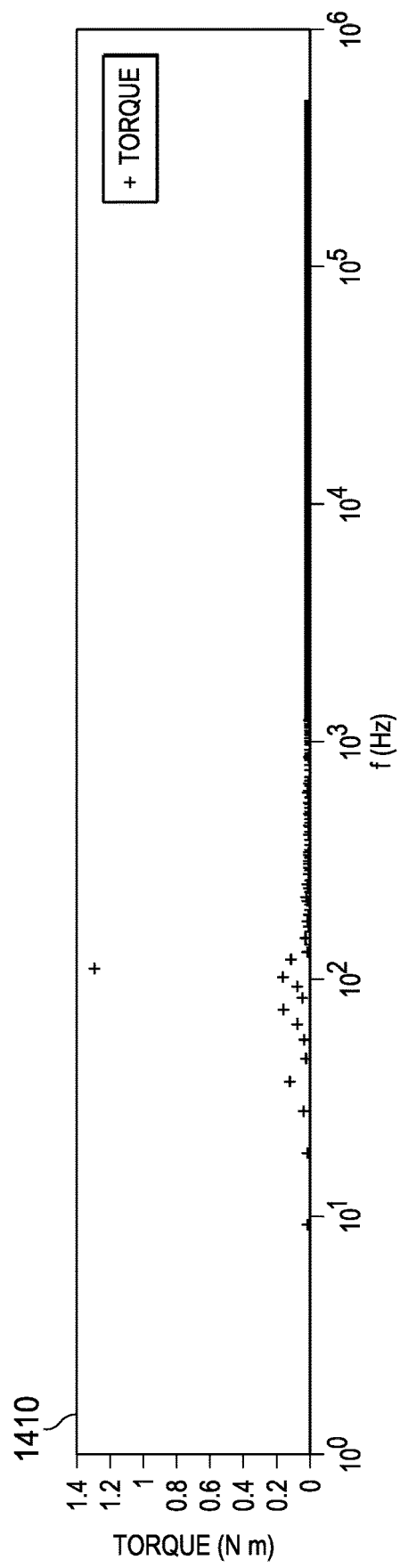
FIG. 14B

ROTOR CONFIGURATION FOR SWITCHED RELUCTANCE MOTOR WITH MINIMIZED TORQUE RIPPLE

CROSS-REFERENCE TO RELATED APPLICATIONS

This application claims priority benefit from U.S. Provisional Application No. 62/705,751, filed on Jul. 14, 2020. The patent application identified above is incorporated here by reference in its entirety to provide continuity of disclosure.

FIELD OF THE INVENTION

The present invention relates to a rotor configuration for a switched reluctance motor that reduces torque ripple. More particularly, the invention relates to optimizing the location, number, size and shape of flux barriers in the rotor of a hybrid switched reluctance motor to reduce torque ripple, thereby reducing acoustical and vibrational responses.

BACKGROUND OF THE INVENTION

A switched reluctance motor (SRM) generates torque based on the principle of reluctance torque using a discontinuous rotating magnetic field. Double saliency in a switched reluctance motor, in both the rotor and the stator, causes magnetic reluctance to change with rotor position. A switched reluctance motor is singly excited on the stator and it does not need windings or magnetic excitation on the rotor. As a result, switched reluctance motors provide a low cost and robust structure which makes them desirable for high speed and demanding applications.

Despite their advantages, switched reluctance motors demonstrate a shared disadvantage of torque ripple. High levels of torque ripple cause undesirable noise and vibration. Further, the noise and vibration contribute to significant efficiency losses.

One approach to reducing torque ripple is through switching controller technology. Switching controller technology adjusts the voltage and/or current applied to the stator of the switched reluctance motor to reduce torque ripple.

U.S. Pat. No. 6,922,036 to Ehsani discloses a method and apparatus for reducing noise and vibration in switched reluctance motor drives. Ehsani describes generating, by a computer, a phase current profile, generating a phase current according to the phase current profile, and applying the phase current to the switched reluctance motor drive to reduce torque ripple.

However, the current technology increases the complexity of the switching controller and can decrease the torque available for useful work. Also, the current technology is less effective at high speeds.

What is needed is a technology that reduces torque ripple without increasing the complexity of the switching controller. What is also needed is a technology that reduces torque ripple without significantly reducing the torque available for useful work, especially at high speed.

SUMMARY OF THE INVENTION

The main contributing factor to torque ripple in switched reluctance motors is non-uniform distribution of flux density and force density in the airgap between the stator and the rotor. Switched reluctance motors experience a sudden rise in flux density and force density in the airgap when the rotor and stator poles start to overlap as the rotor revolves. This causes a sudden rise in the force density in both tangential and radial components that in-turn leads to torque ripple and the resulting acoustical and vibration responses.

An embodiment of the invention comprises a hybrid switched reluctance motor having a stator and a rotor with flux barriers. Each of the flux barriers is a structural feature of the rotor that defines a volume of the rotor that diverts magnetic flux. Depending on the rotor's position, each flux barrier's orientation to magnetic flux paths from the stator changes and this creates implicit saliency for the rotor that in-turn creates reluctance torque for the hybrid switched reluctance motor. A flux barrier shape that induces a gradual change in implicit saliency for the rotor and in-turn a gradual change in the reluctance torque for the motor helps the motor to avoid sharp rises in the flux density. This will reduce the magnitude and variation of the tangential and radial forces in the airgap while the rotor is moving and result in a smoother and more symmetric torque profile, and consequently substantially less noise and shaking.

An embodiment of the invention comprises a hybrid switched reluctance motor having a stator with a plurality of stator poles and a rotor with a plurality of rotor poles and a plurality of interpole segments, each of the plurality of interpole segments having an arcuate concave void and a plurality of arcuate flux barriers, that create implicit saliency for the rotor that in-turn create reluctance torque for the hybrid switched reluctance motor. This embodiment dramatically reduces torque ripple in the hybrid switched reluctance motor at all speeds without increasing switching controller complexity, and without significantly reducing the torque available for useful work.

BRIEF DESCRIPTION OF THE DRAWINGS

FIG. 4 is a schematic diagram of a quadrant of a rotor of a hybrid switched reluctance motor.

FIGS. 5A, 5B and 5C is a schematic diagram of a portion of a rotor of a hybrid switched reluctance motor.

FIG. 13B is a graph showing the torque profile of a switched reluctance motor.

FIG. 14A is a graph showing the axial, tangential, and radial vibrations as a function of accelerations for a hybrid switched reluctance motor.

FIG. 14B is a graph showing the torque profile of a hybrid switched reluctance motor.

DETAILED DESCRIPTION OF THE INVENTION

In the description that follows, like parts are marked throughout the specification and figures with the same numerals, respectively. The figures are not necessarily drawn to scale and may be shown in exaggerated or generalized form in the interest of clarity and conciseness.

In the description of the embodiments and experimental details that follows, the phrase "torque ripple" means a periodic increase or decrease in output torque of a switched reluctance motor as the rotor revolves. It can be measured as the difference in maximum and minimum torque over one complete revolution, generally expressed as a percentage. The phrase "flux barrier" means a structural feature of a rotor of a switched reluctance motor defining a volume of the rotor that diverts magnetic flux. For instance, a flux barrier can be an enclosed volume of air within the rotor located between poles of the rotor. The phrase "hybrid switched reluctance motor" means a switched reluctance motor having a rotor with flux barriers that reduce torque ripple. The term saliency means the variation of inductance measured at the switch reluctance motor terminals according to the rotor position.

Figure 1:
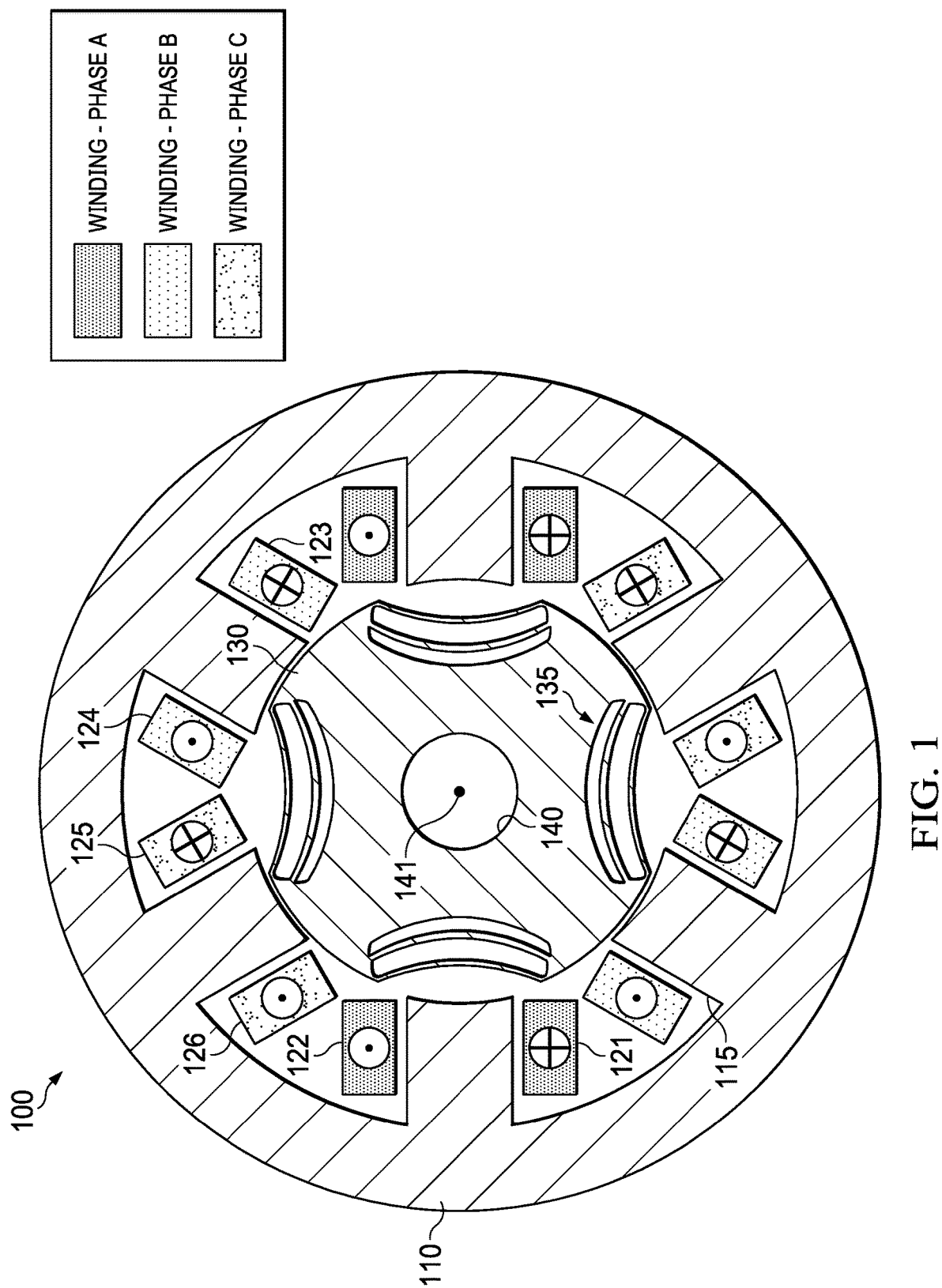
FIG. 1 is a schematic diagram of a hybrid switched reluctance motor.

FIG. 1 shows a cross-sectional view of a hybrid switched reluctance motor 100. The hybrid switched reluctance motor comprises a stator 110 and a rotor 130. In a preferred embodiment, the stator is configured as a 6-pole stator. However, the invention is not limited to 6-pole stators and the number of stator poles can be different.

In a preferred embodiment, the excitation is three phase, the stator winding is concentrated, and each phase is wound around a pair of poles 115 in full pitch distance. The resulting configuration comprises (2) phase A positive winding poles 121, (2) phase A negative winding poles 122, (2) phase B positive winding poles 123, (2) phase B negative winding poles 124, (2) phase C positive winding poles 125, and (2) phase C negative winding poles 126. However, the invention is not limited to three phase excitation, concentrated winding, or full pitch distance winding around a pair of poles.

In a preferred embodiment, the rotor is configured as a 4-pole rotor. The rotor comprises eight flux barriers 135 and a central aperture 140 defining an axis of rotation 141. However, the invention is not limited to 4 pole rotors having eight flux barriers, the number of rotor poles can be of any reasonable number covering all possible permutations, and there can be a smaller or larger number of flux barriers.

Figure 2A:
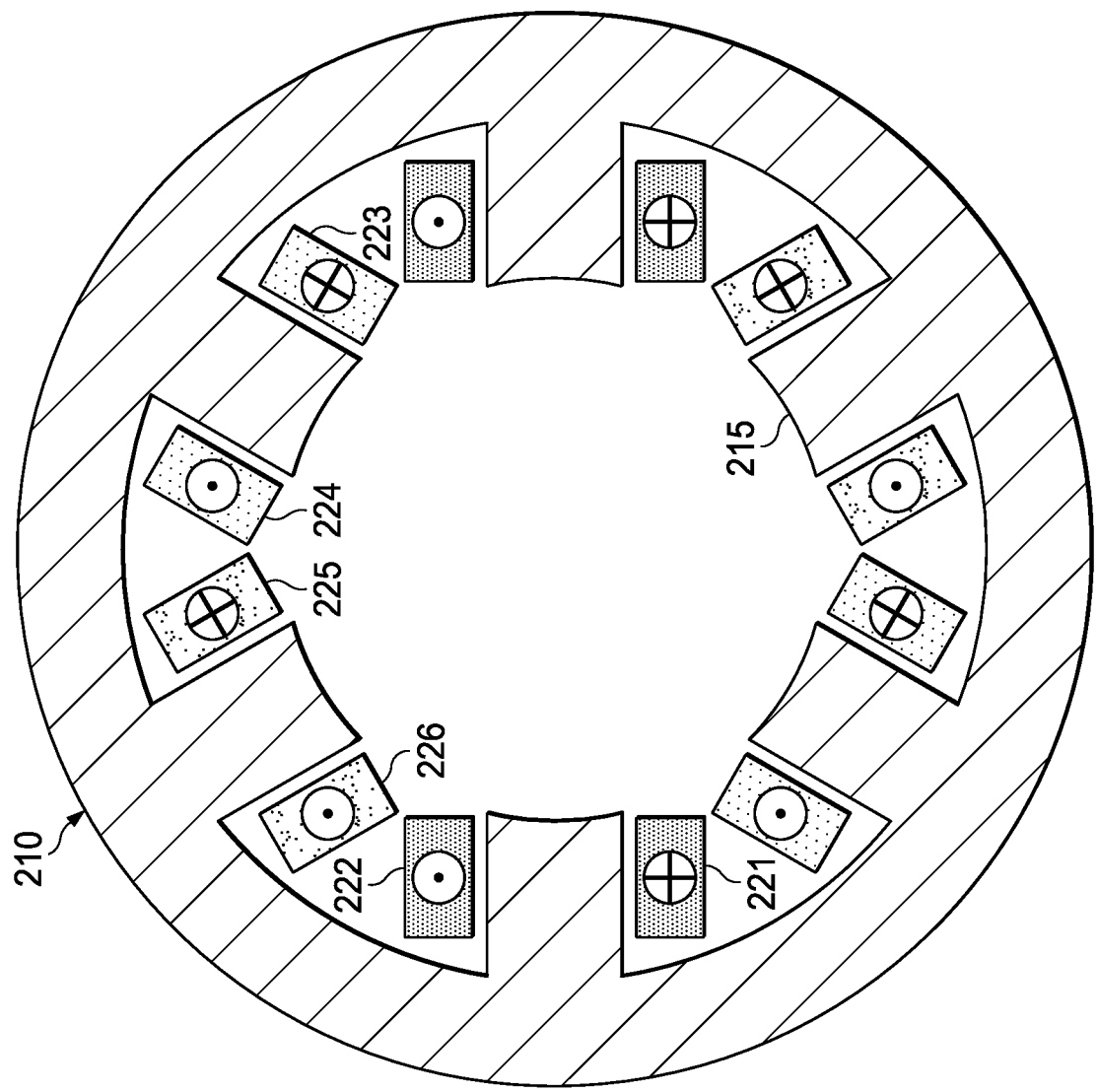
FIG. 2A is a schematic diagram of a stator of a hybrid switched reluctance motor.

FIG. 2A shows a cross-sectional view of a stator 210. The stator is configured as a 6-pole stator. The excitation is three phase, the stator winding is concentrated, and each phase is wound around a pair of poles 215 in full pitch distance. The configuration comprises (2) phase A positive winding poles 221, (2) phase A negative winding poles 222, (2) phase B positive winding poles 223, (2) phase B negative winding poles 224, (2) phase C positive winding poles 225, and (2) phase C negative winding poles 226.

Figure 2B:
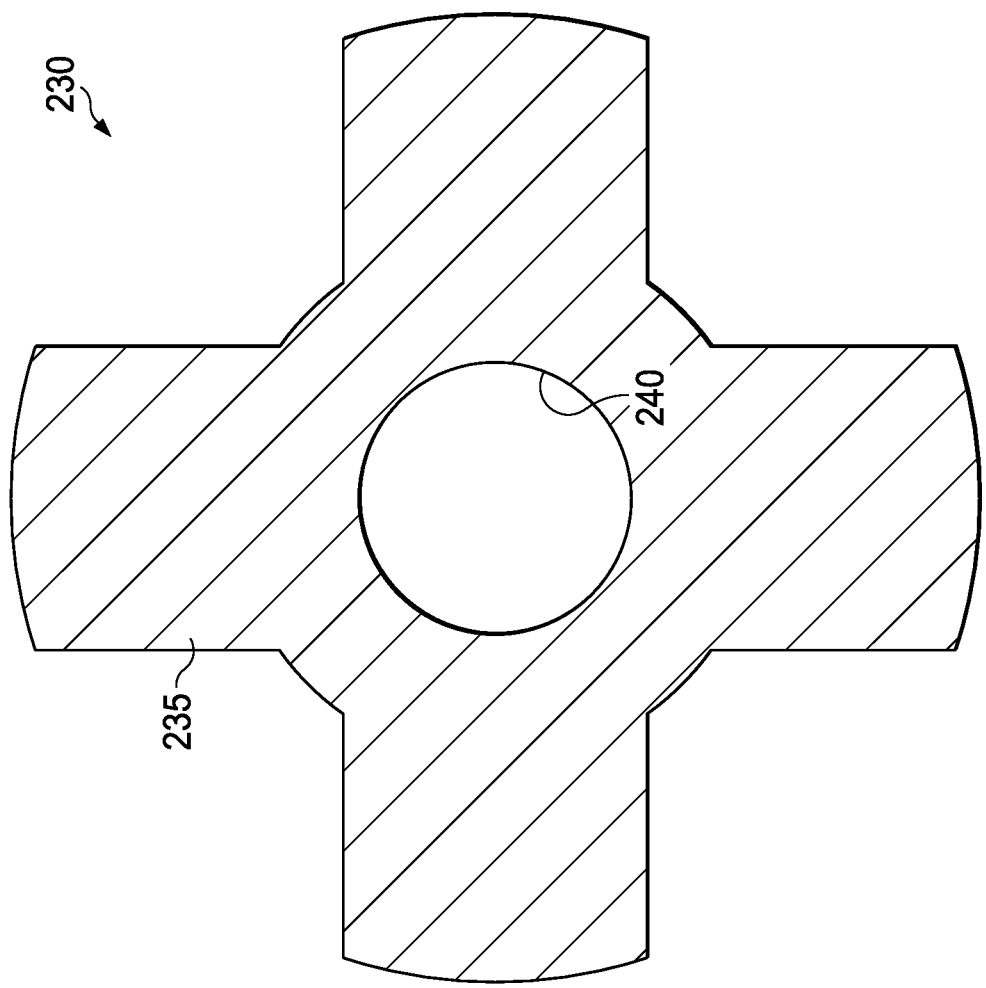
FIG. 2B is a schematic diagram of a rotor of a switched reluctance motor without flux barriers.

FIG. 2B shows a cross-sectional view of a rotor 230. This comparative rotor does not have flux barriers. The rotor comprises (4) poles 235 and a central aperture 240 defining an axis of rotation.

A preferred embodiment is comprised of a 6-pole stator and 4-pole rotor, as previously described. However, the invention is not limited to the pole configuration described because those skilled in the art may modify the configuration of poles using the proposed rotor and flux barriers.

Figure 3:
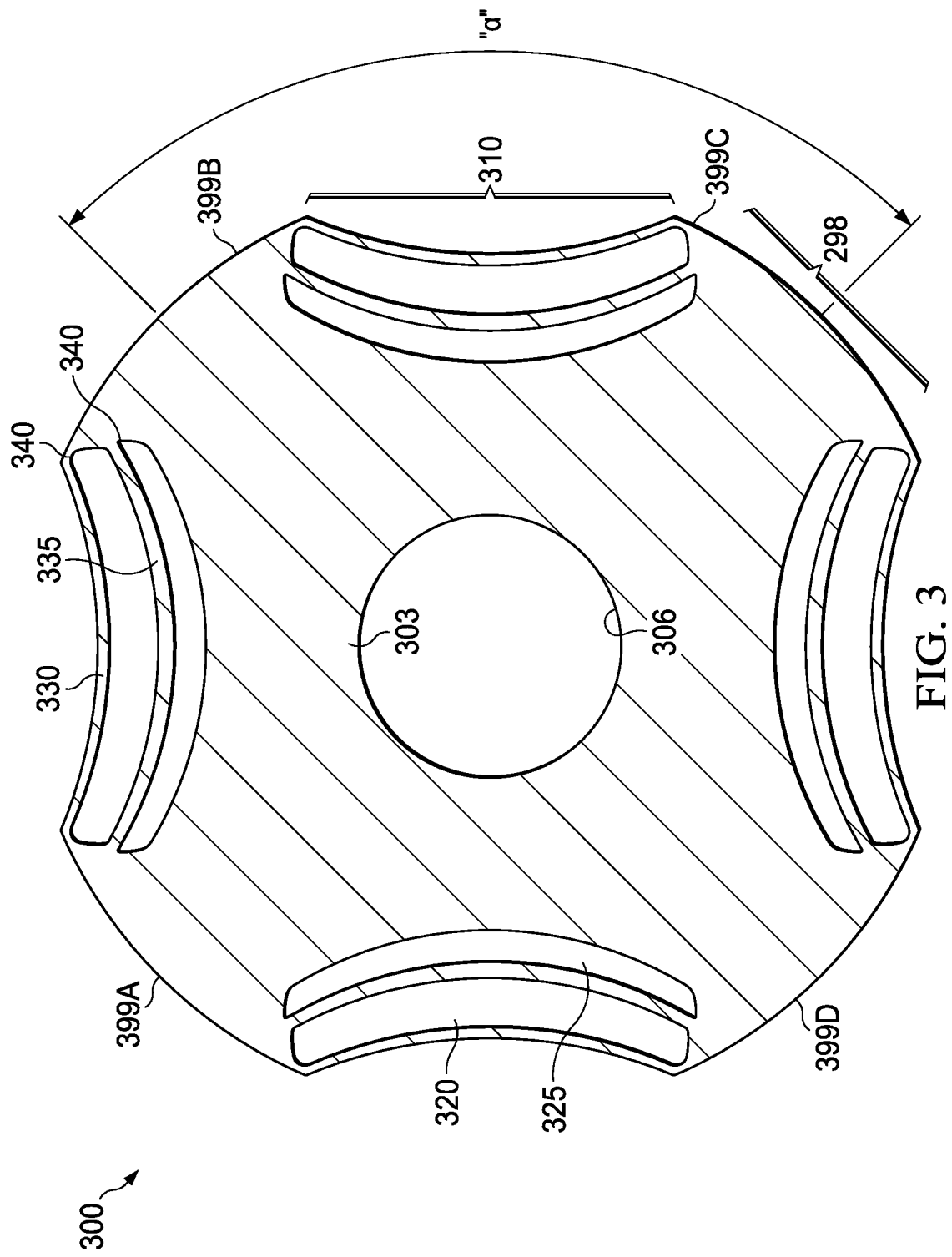
FIG. 3 is a schematic diagram of a rotor of a hybrid switched reluctance motor.

FIG. 3 shows a preferred embodiment of rotor 300 with outer flux barriers 320 and inner flux barriers 325. The flux barriers can comprise air or any other substantially non-magnetic material, such as an epoxy filler. The rotor is configured as a 4-pole rotor and comprises four (4) poles 298, a rotor core 303 and an aperture 306 for a rotor shaft. The poles are each separated by an equal angle α of 90°. The rotor poles comprise four (4) arcuate outer surfaces 399a, 399b, 399c and 399d. Each of the arcuate surfaces is defined by perimeter circle 414. Adjacent each of the poles is a concave void 310. The rotor further comprises outer flux barriers 320 and inner flux barriers 325. The concave voids, the outer flux barriers, and the inner flux barriers are separated by iron ribs 330 and 335. Iron bridges 340 are located between the edges of each flux barrier and the arcuate outer surface of the adjacent poles.

In a preferred embodiment, there are two flux barriers between each pair of adjoining poles of the rotor. The number of flux barriers directly affects the maximum inductance of the motor. A higher number of flux barriers reduces the maximum inductance and thus, the average torque.

In a preferred embodiment, the rotor and stator materials comprise non-orientated electric steel M19 (ASTM 36F155, 47F165 or 64F2000). However, the invention is not limited to a specific material and embodiments can comprise other suitable rotor and stator materials such as M15 (ASTM 36F145) or M22 (ASTM 36F165, 47F180 or 64F210).

On the one hand, reluctance torque generation is proportional to the difference between minimum and maximum inductances of the phase winding. On the other hand, the profile of inductance transition between the two extremes determines the torque ripple. Accordingly, preferred embodiments maximize the difference between minimum and maximum inductances of the phase winding while smoothing the transition between the aligned and unaligned positions. To meet these objectives, specific parameters of the rotor can be optimized.

Figure 5B:
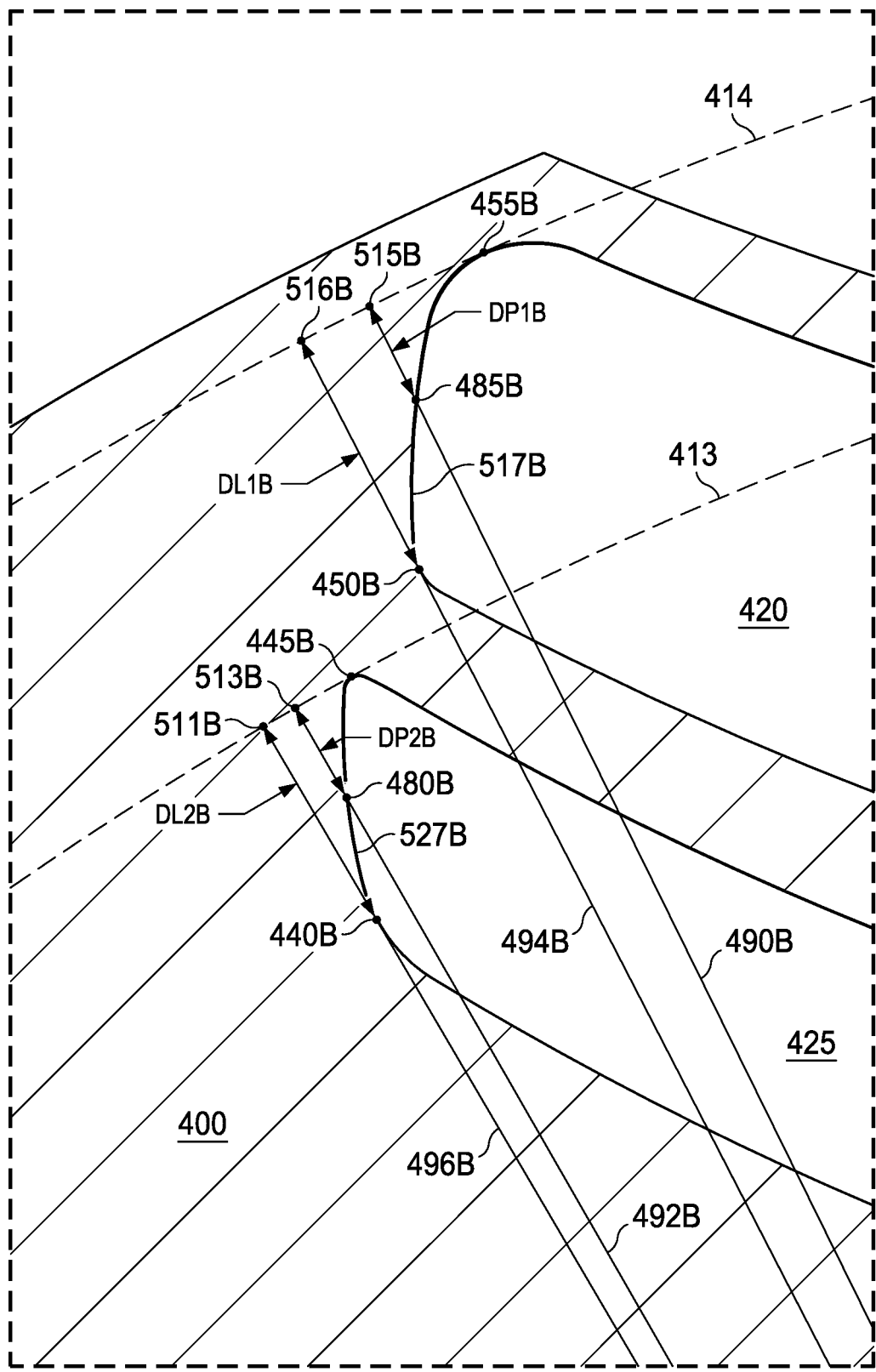
Figure 5C:
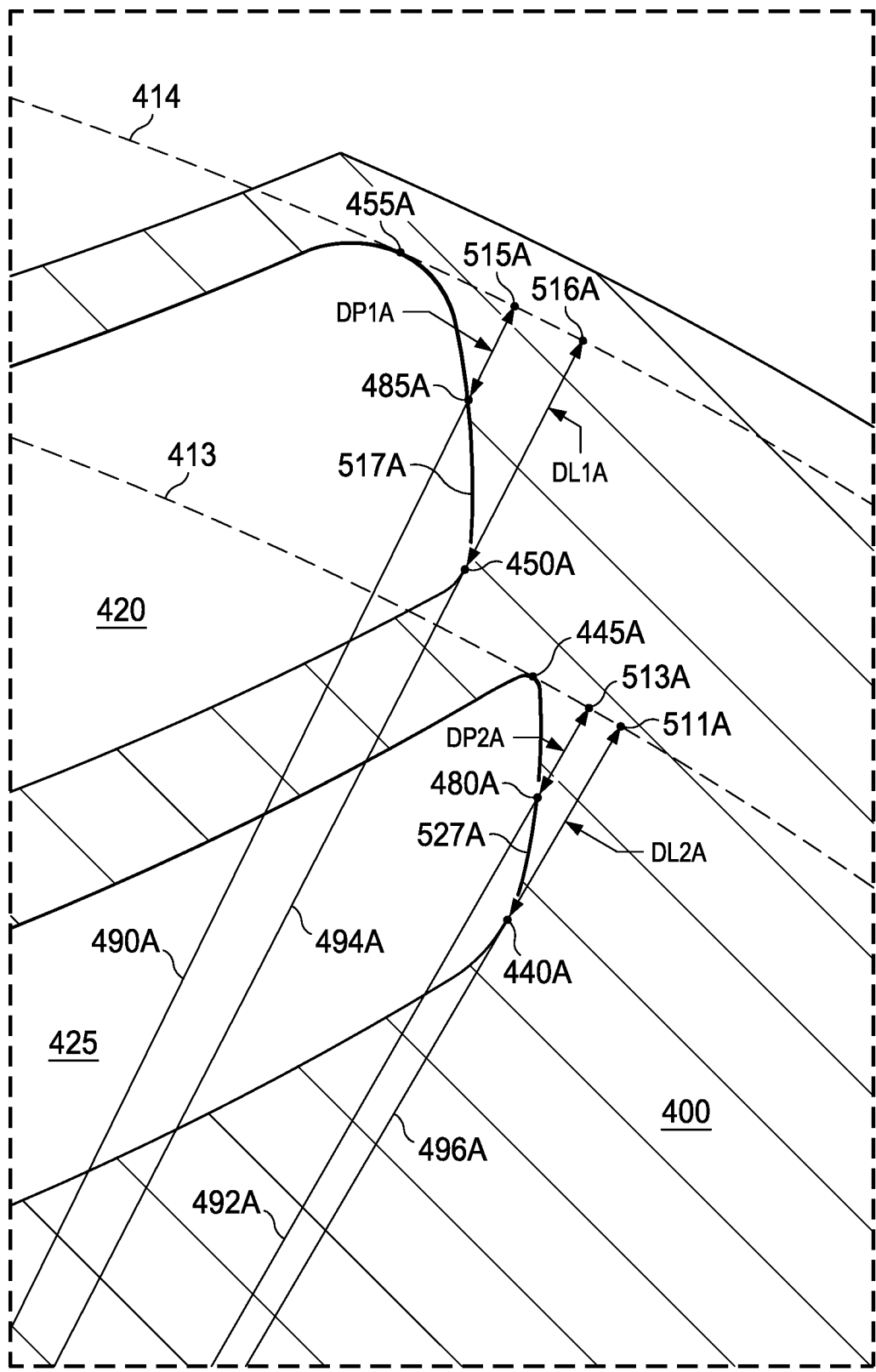

FIGS. 4, 5A, 5B and 5C are partial views of rotor 400 that depict relative dimensional parameters. FIG. 4 is a view of approximately 66° of a rotor showing one of four interpole segments and adjoining portions of two of four rotor poles. FIG. 5A is an expanded view of a portion of FIG. 4. The relative dimensional parameters include cut off width (Wd0), flux barrier width (Wd1, Wd2), iron rib width (Ib0, Ib1), iron bridge width (db0, db1), flux barrier edge cut length (DL1, DL2) and flux barrier end steepness (DP1, DP2). Parameter DP is aligned on a radius of the rotor originating at its center.

Parameters Wd and Ib substantially determine the saliency of the hybrid switched reluctance motor. These parameters define the overall shape and size of the flux barriers. Optimizing these parameters provides low torque pulsation while maintaining the torque average.

Parameters DP, DL and db determine the flux path width in the iron bridges. These parameters define the details of the flux barriers such as closeness to the external surface of the rotor and shape of the flux barrier end boundaries. Optimizing these parameters provides a gradual change in the inductance and consequently less torque pulsation.

Concave void 410 is bounded by exterior arcuate surface 415. Cut off width Wd0 is taken between the center of arcuate surface 415 and circle 414, along a radial line extending outwardly from axis of rotation 141.

Wd1 is the flux barrier width of outer flux barrier 420. Outer flux barrier 420 is bounded by outer barrier inner arcuate surface 470, curved outer flux barrier end surfaces 517a and 517b, outer barrier outer arcuate surface 475.

Wd2 is the flux barrier width of inner flux barrier 425. Inner flux barrier 425 is bounded by inner barrier inner arcuate surface 460, curved inner flux barrier end surfaces 527a and 527b, inner barrier outer arcuate surface 465.

Ib0 is the width of inner iron rib 435, located between inner flux barrier 425 and outer flux barrier 420. Ib1 is the width of outer iron rib 430 between outer flux barrier 420 and concave void 410.

db0 is the iron bridge width between outer flux barrier 420 and the exterior surface of the rotor. db1 is iron bridge width between inner flux barrier 425 and the exterior surface of the rotor.

In a preferred embodiment, the flux barrier boundaries are based on the Joukowsky airflow potential equations. The boundaries follow the flux lines in the rotor so that when the motor is in use, the flux barriers obstruct flux when they are perpendicular to the flux lines and permit flux to pass when they are parallel to the flux lines. The boundaries improve the saliency of the rotor which is the basis for the reluctance torque generation in the motor. In this embodiment, curves for arcuate surfaces 415, 475, 470, 465 and 460 are formed using the following equation:

$$r(\theta) = \left(\frac{D_{shaft}}{2}\right) \cdot \sqrt[p]{\frac{C + \sqrt{C^2 + 4\sin^2(p.\theta)}}{2\sin(p.\theta)}}$$

where:

p is the machine pole pair number;

$D_{shaft}$ is the shaft diameter;

r is the radius (distance from the rotor center);

θ is the mechanical angle of the point on the curve in polar coordinates;

C is a constant value for an iso-potential line of the rotor.

In Table 1, value ranges for θ and C are shown for each of the boundaries. The value of angle θ when aligned with the Wd arrows in FIG. 4 is π/4 radians, thus forming the boundaries as shown. In this embodiment, the machine pole pair number p is 2 and $D_{shaft}$ is 25 mm. Each Point on the curves can be calculated using r and θ components in polar coordinates. θ ranges for each curve are provided and the formula gives r values for each point on the curve. Of course, the invention is not limited to the exemplary formulation and the invention can use alternative formulations.

TABLE 1

|  | 415 | 475 | 470 | 465 | 460 |
|---|---|---|---|---|---|
| θ range (radian) | 0.38-1.18 | 0.37-1.2 | 0.32-1.25 | 0.29-1.28 | 0.28-1.3 |
| r range (mm) | 38.16-45.28 | 37.10-44.87 | 32.38-41.55 | 30.96-41.29 | 27.74-38.24 |
| C | 9.1975 | 8.6794 | 6.5448 | 5.9532 | 4.7081 |

FIGS. 4, 5A, 5B and 5C illustrate the parameter classes DL and DP for outer flux barrier 420 and inner flux barrier 425. Inner flux barrier 425 has an inner edge points 440a and 440b. Inner flux barrier 425 has outer edge points 445a and 445b. Outer flux barrier 420 has inner edge points 450a and 450b. Outer flux barrier 420 has outer edge points 455a and 455b. Inner edge point 440a and outer edge point 445a are connected by end surface 527a. Inner edge point 440b and outer edge point 445b are connected by end surface 527b. Inner edge point 450a and outer edge point 455a are connected by end surface 517a. Inner edge point 450b and outer edge point 455b are connected by end surface 517b. Midpoint 480a is located at the middle of end surface 527a. Midpoint 480b is located at the middle of end surface 527b. Midpoint 485a is located at the middle of end surface 517a. Midpoint 485b is located at the middle of end surface 517b.

End surfaces 527a, 527b, 517a, and 517b are all defined using spline drawing tool in ANSYS Maxwell software. A natural spline type is defined using a piecewise cubic spline having a general formula:

$$Y_i(x) = a_i + b_i x + c_i x^2 + d_i x^3$$

where:

x is the variable for the function, here x component;

i=1, 2 ... n−1; and, a, b, c and d are coefficients.

In Table 2, an exemplary set of ranges for x, a, b, c and d are shown for each of the end surfaces. Of course, the disclosure is not limited to the exemplary natural spline type and the invention can use alternative splines or interpolation techniques.

TABLE 2

|  | 517a | 527a | 517b | 527b |
|---|---|---|---|---|
| x range mm | 33.22-36.35 | 37.1-41.05 | 33.22-36.35 | 37.1-41.05 |
| a | −0.0002101e4 | −0.0000445e4 | 0.0002101e4 | 0.0000445e4 |
| b | 0.0166657e4 | 0.0041933e4 | −0.0166657e4 | −0.0041933e4 |
| c | −0.4440131e4 | −0.1348427e4 | 0.4440131e4 | 0.1348427e4 |
| d | 3.9378229e4 | 1.4225928e4 | −3.9378229e4 | −1.4225928e4 |

Dimension DP1$a$ is taken along radial 490$a$ that extends from the center of rotor 599, passes through midpoint 485$a$ and ends at intersection point 515$a$ on circle 414.

Dimension DP1$b$ is taken along radial 490$b$ that extends from the center of rotor 599, passes through midpoint 485$b$ and ends at circle 414 at end point 515$b$.

Dimension DP2$a$ is taken along radial 492$a$ that extends from the center of rotor 599, passes through midpoint 480$a$ and ends at intersection point 513$a$ at circle 413.

Dimension DP2$b$ is taken along radial 492$b$ that extends from the center of rotor 599, passes through midpoint 480$b$ and ends at intersection point 513$b$ at circle 413.

Dimension DL1$a$ is taken along radial 494$a$ that extends from the center of rotor 599, passes through inner edge point 450$a$ and ends at circle 414 at end point 516$a$.

Dimension DL1$b$ is taken along radial 494$b$ that extends from the center of rotor 599, passes through inner edge point 450$b$ and ends at circle 414 at end point 516$b$.

Dimension DL2$a$ is taken along radial 496$a$ that extends from the center of rotor 599, passes through inner edge point 440$a$ and ends at circle 413 at end point 511$a$.

Dimension DL2$b$ is taken along radial 496$b$ that extends from the center of rotor 599, passes through inner edge point 440$b$ and ends at circle 413 at end point 511$b$.

In a preferred embodiment, there is an increasing trend in iron bridge width for the flux barriers, starting from the rotor surface. In this preferred embodiment db0<db1. The iron bridge width mainly determines the inductance of the motor in its lower values close to unaligned position when it is rising. Therefore, having such a trend contributes to a smoother rise in the reluctance when the rotor starts moving and thus lowers torque ripple.

In a preferred embodiment, the inner edge of each flux barrier is located further from the rotor surface and closer to the rotor center compared to the outer edge of each flux barrier. In this preferred embodiment it can be advantageous when DL2<DL1. This combination of features helps to keep the minimum inductance low and simultaneously causes a gradual change in the inductance while the rotor is moving.

In a preferred embodiment, the position of the midpoint of the edges of each flux barrier, shapes the end boundary and can improve the results. In this preferred embodiment it can be advantageous when DP2>DP1.

In a preferred embodiment, there is an increasing trend in the width of the flux barriers and the cut off Wd0, starting from the interior of the rotor. In this preferred embodiment Wd2<Wd1<Wd0.

In a preferred embodiment, there is an increasing trend in iron rib thickness, starting from the rotor surface. In this preferred embodiment Ib1<Ib0.

The following dimensions of a preferred embodiment are shown in Table 3.

TABLE 3

| Direction | mm |
|---|---|
| db0 | 0.61 |
| db1 | 3.96 |
| 1b0 | 1.4 |
| 1b1 | 1.2 |
| Wd0 | 7.2 |
| Wd1 | 4.7 |
| Wd2 | 3.2 |
| DP1a | 0.61 |
| DP1b | 0.61 |
| DP2a | 0.68 |
| DP2b | 0.68 |
| DL1a | 3.23 |
| DL1b | 3.23 |
| DL2a | 3.05 |
| DL2b | 3.05 |

Figure 6A:
FIGS. 6A, 6B, 6C and 6D are a set of graphs showing magnetic inductance as a function of rotor position for all three phases together (6A) and each phase individually (6B-6D) in a hybrid switched reluctance motor.
Figure 6B:
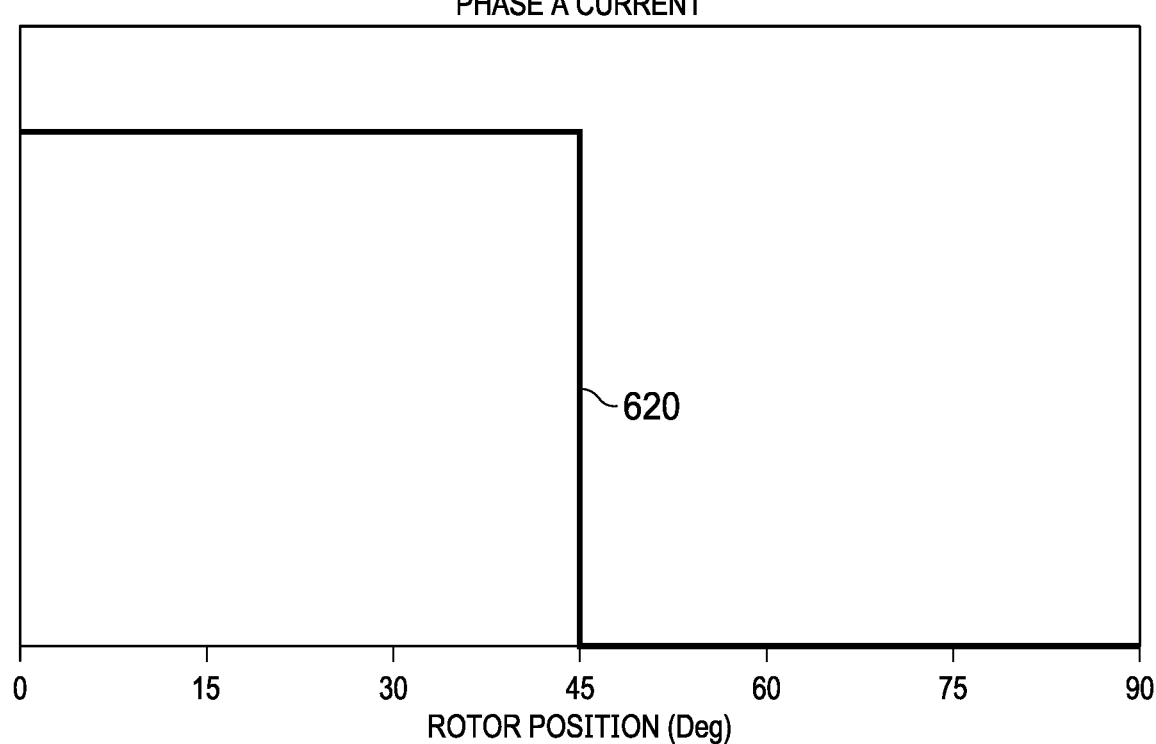
Figure 6C:
Figure 6D:
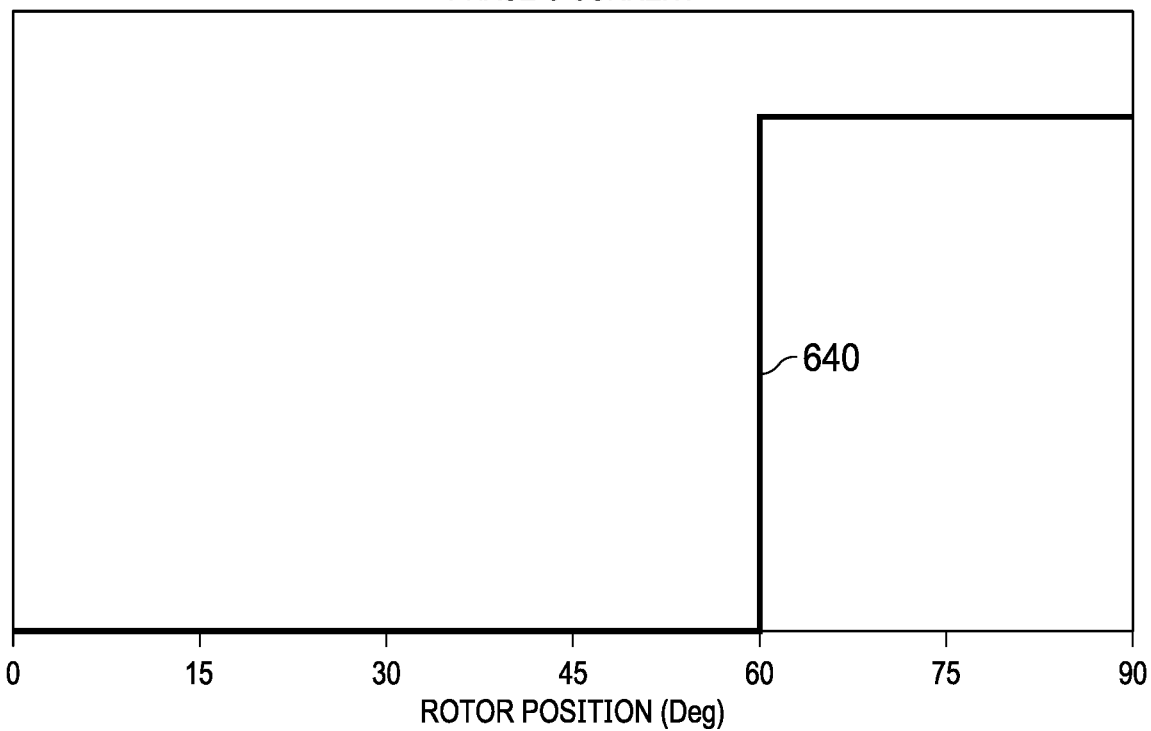

FIGS. 6A, 6B, 6C and 6D depict ideal inductance and three phase switching patterns for a hybrid switched reluctance motor. FIG. 6A shows ideal inductance 610 as a function of rotor position from 0° to 90°. FIG. 6B shows phase A current 620 for rotor position from 0° to 90°. FIG. 6C shows phase B current 630 for rotor position from 0° to 90°. FIG. 6D shows phase C current 640 for rotor position from 0° to 90°. Each phase of the motors is excited with a rectangular current for 450 of rotor rotation. As illustrated, each phase is turned on 30° after the previous phase is turned on and the consecutive phases have 15° overlap.

A comparison of a synchronized reluctance motor as described and a switched reluctance motor of the prior art is provided. The motors have the same stator and rotor dimensions and airgap length. The synchronized reluctance motor has a rotor with flux barriers as illustrated in FIGS. 1 and 3 to 5. The switched reluctance motor has a rotor without flux barriers as illustrated in FIG. 2B.

Table 4 summarizes the common experimental parameters for the two motors.

TABLE 4

| Parameter | Value |
|---|---|
| Rated Speed | 2000 RPM |
| Rotor Pole Number | 4 |
| Stator Pole Number | 6 |
| Airgap | 0.3 mm |
| Pick Current | 18 A |
| Turn per Phase | 100 |

Table 5 shows switched reluctance motor and hybrid switched reluctance motor performances in comparison with one another. The hybrid switched reluctance motor significantly reduces torque ripple compared to the switched reluctance motor while maintaining the average torque. The lower torque ripple of the hybrid switched reluctance motor results in lower vibration and noise as compared to the switched reluctance motor.

TABLE 5

| Design | Average Torque (N.m) | Torque Ripple (%) |
|---|---|---|
| Switch Reluctance Motor | 12.88 | 39.29 |
| Hybrid Switched Reluctance Motor | 12.48 | 12.97 |
| Reduction (%) | 3.1 | 66.99 |

Figure 7:
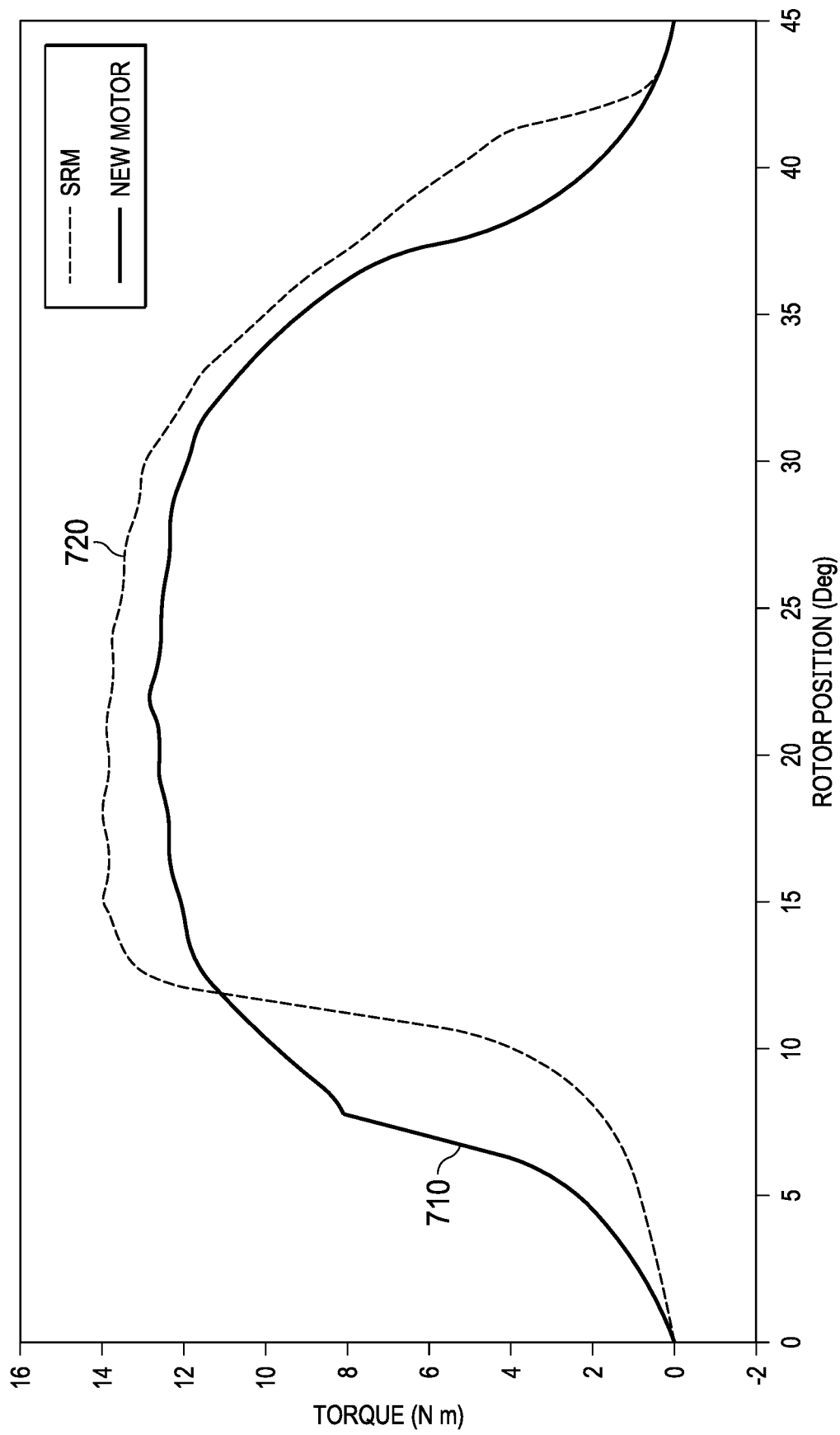
FIG. 7 is a graph showing single phase torque as a function of rotor position for a hybrid switched reluctance motor compared to switched reluctance motor having a rotor without flux barriers.
Figure 8:
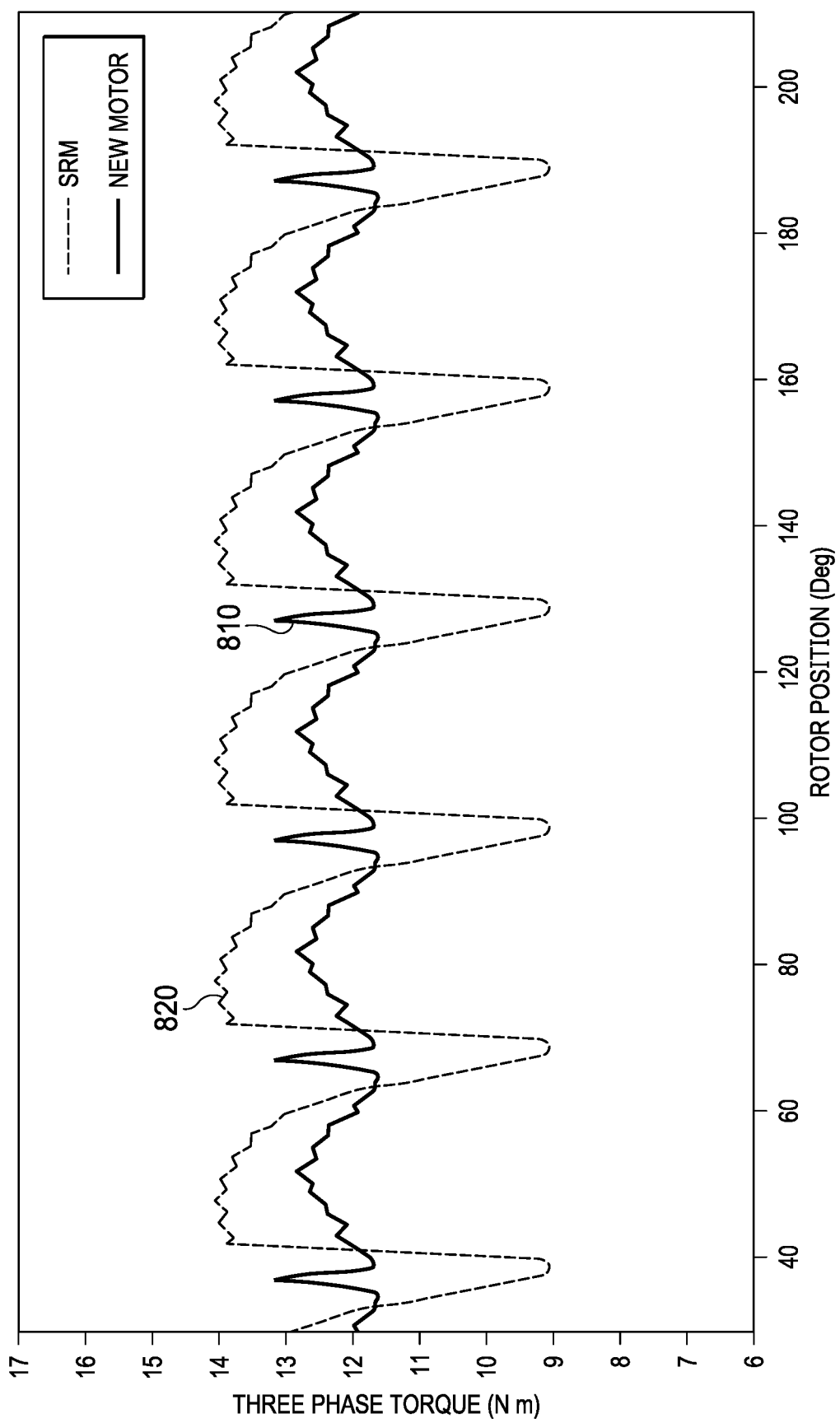
FIG. 8 is a graph showing three phase torque as a function of rotor position for a hybrid switched reluctance motor compared to a switched reluctance motor having a rotor without flux barriers.

FIGS. 7 and 8 demonstrate improvement in reducing torque ripple which is the main source of noise and vibration in both switched reluctance motors and hybrid switched reluctance motors.

FIG. 7 shows single phase torque as a function of rotor position for hybrid switched reluctance motor 710 and single phase torque as a function of rotor position for comparative switched reluctance motor 720. It can be observed that the torque profile for the hybrid switched reluctance motor has a much more symmetric shape. Unlike the abrupt rise present in torque for the comparative switched reluctance motor, the torque rise for the hybrid switched reluctance motor is smoother due to the gradual change of the inductance. Further, this symmetric distribution of the torque characteristics provides more room for more effective current profiling using a switching controller.

FIG. 8 shows 3 phase torque as a function of rotor position for hybrid switched reluctance motor 810 and 3 phase torque as a function of rotor position for comparative switched reluctance motor 820. The torque ripple has been reduced significantly in the hybrid switched reluctance motor versus the comparative switched reluctance motor.

Figure 9:
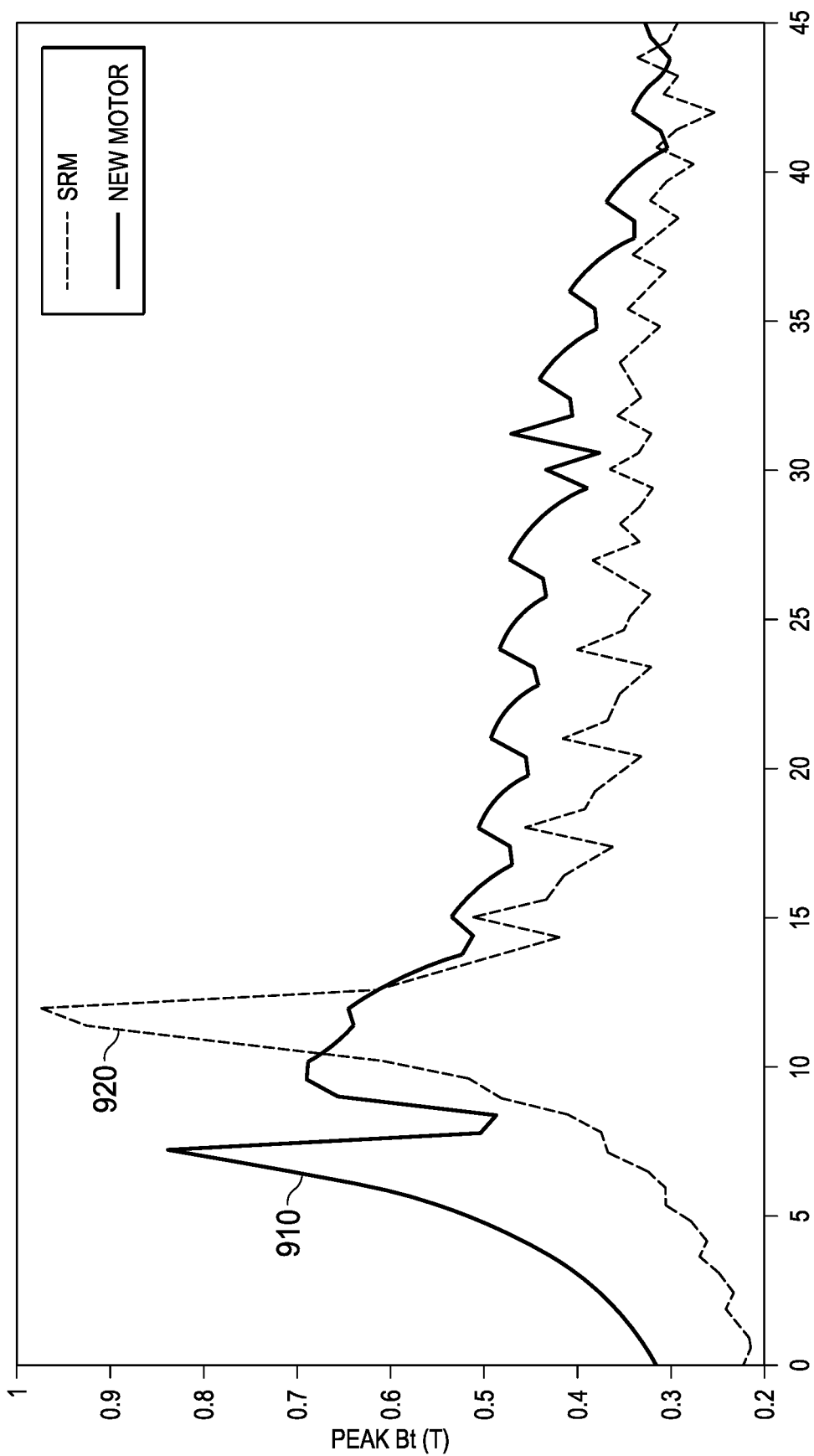
FIG. 9 is a graph showing peak magnetic flux tangential component as a function of rotor position for a hybrid switched reluctance motor compared to a switched reluctance motor having a rotor without flux barriers.

FIG. 9 shows tangential flux density in the middle of the airgap as a function of rotor position for hybrid switched reluctance motor 910 and tangential flux density in the middle of the airgap as a function of rotor position for comparative switched reluctance motor 920. Of note, the hybrid switched reluctance motor exhibits lower peak tangential flux density rises during rotation versus the comparative switched reluctance motor.

Figure 10:
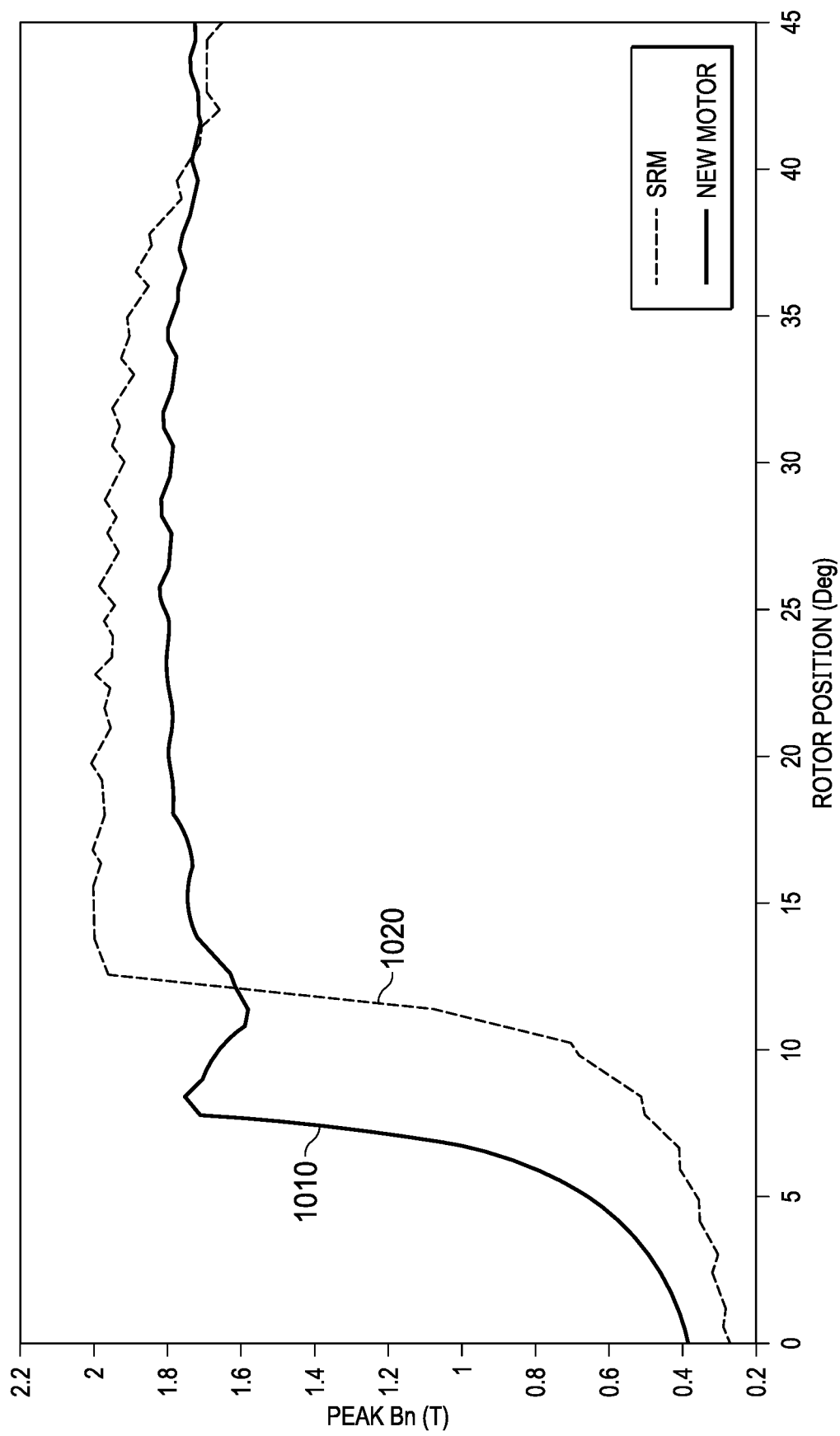
FIG. 10 is a graph showing peak magnetic flux normal (radial) component as a function of rotor position for a hybrid switched reluctance motor compared to a switched reluctance motor having a rotor without flux barriers.

FIG. 10 shows radial flux density in the middle of the airgap as a function of rotor position for hybrid switched reluctance motor 1010 and radial flux density in the middle of the airgap as a function of rotor position for comparative switched reluctance motor 1020. Here again, the radial flux density for the new motor has a lower maximum and exhibits an overall smoother shape. The tangential and radial components of the flux density together develop the force density for the motor.

Figure 11:
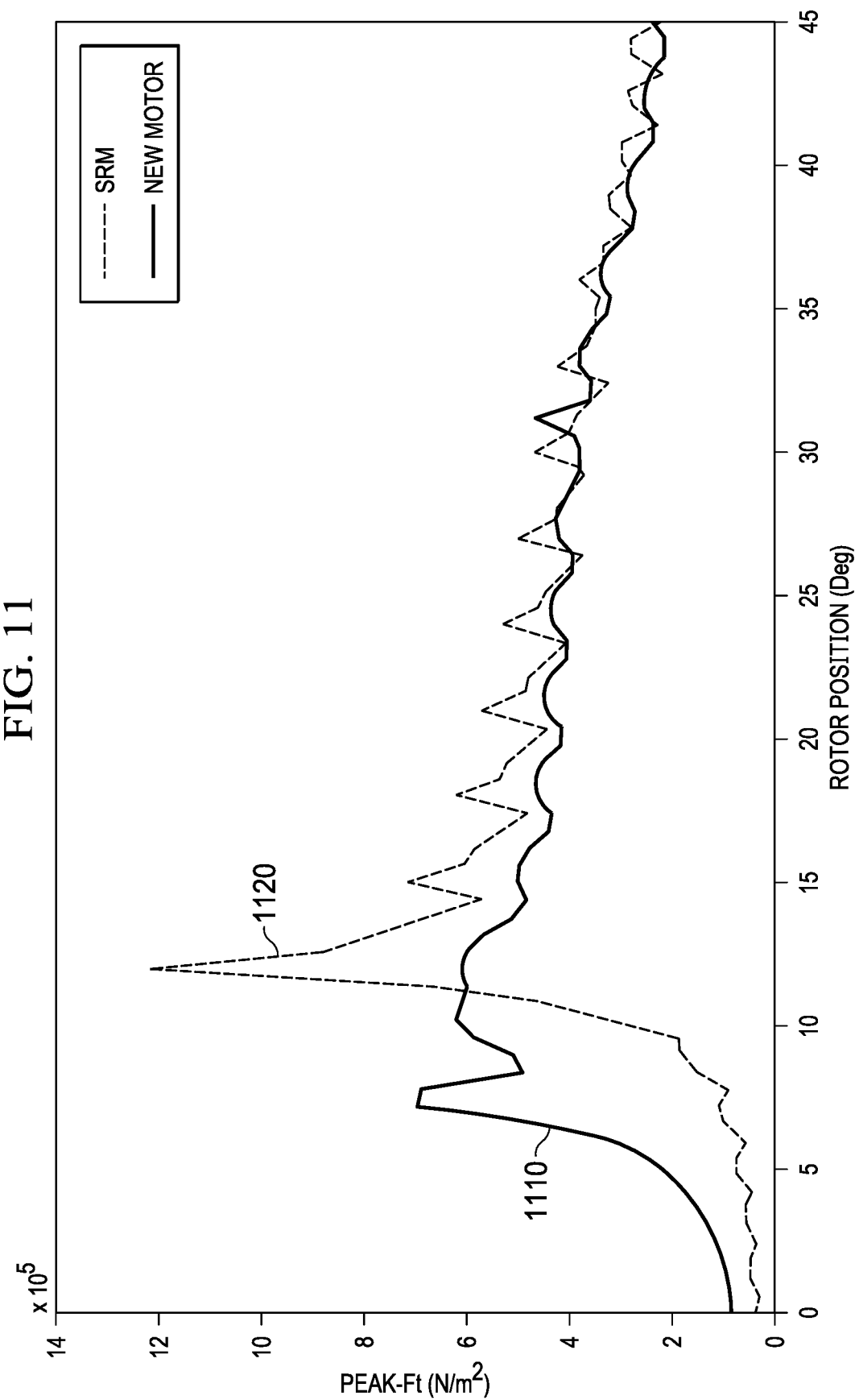
FIG. 11 is a graph showing peak force density tangential component as a function of rotor position for a hybrid switched reluctance motor compared to a switched reluctance motor having a rotor without flux barriers.
Figure 12:
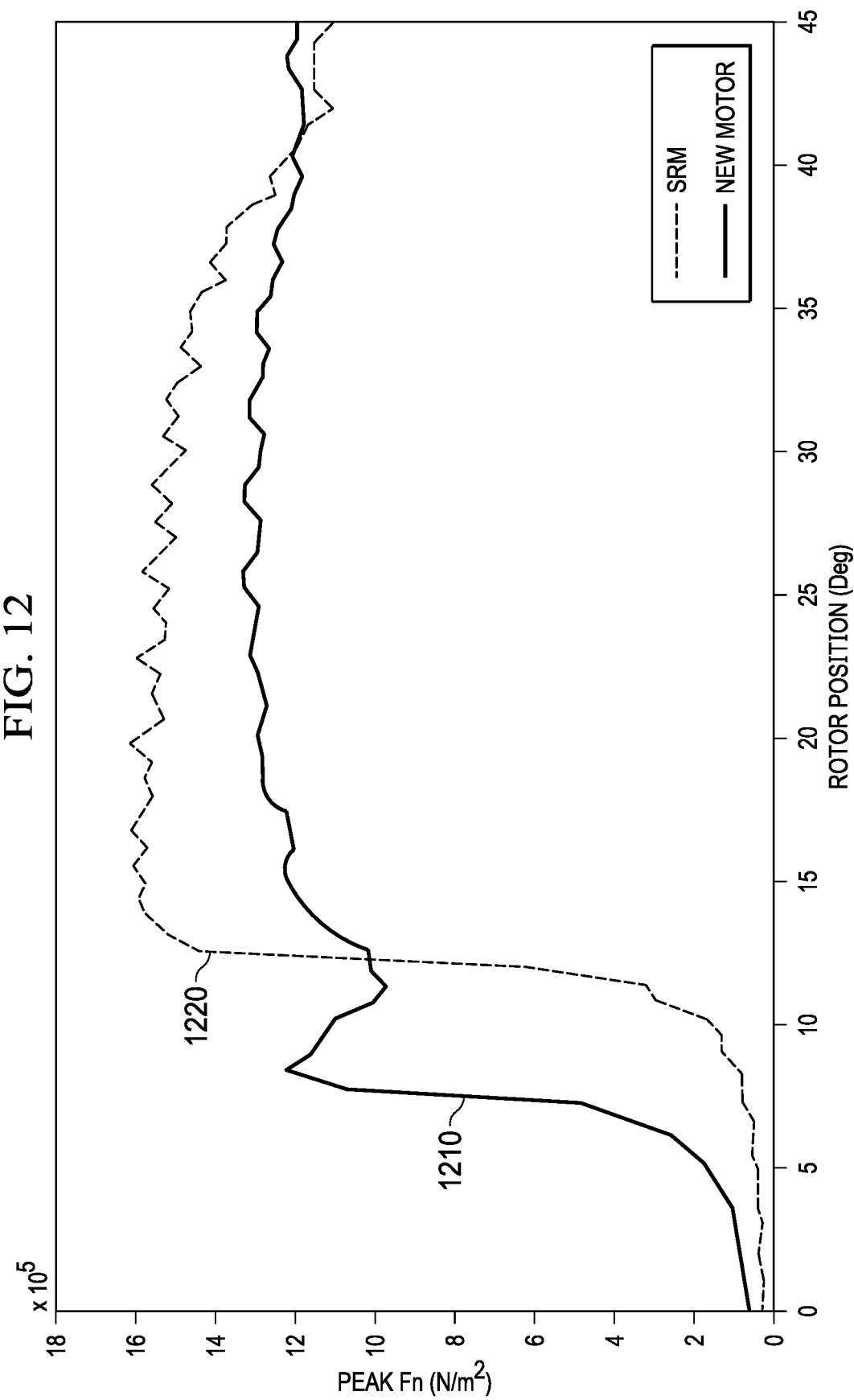
FIG. 12 is a graph showing peak force density normal (radial) component as a function of rotor position for a hybrid switched reluctance motor compared to a switched reluctance motor having a rotor without flux barriers.

FIGS. 11 and 12 demonstrate the resultant radial and tangential force peak densities. The figures show that hybrid switched reluctance motors experiences less stress than switched reluctance motors.

FIG. 11 shows tangential force density in the middle of the airgap as a function of rotor position for hybrid switched reluctance motor 1110 and tangential force density in the middle of the airgap as a function of rotor position for comparative switched reluctance motor 1120. The peak tangential force density variation for the new motor is considerably smoother than a switched reluctance motor. The tangential force produces the useful torque needed for the rotation of the rotor. Therefore, the proposed motor can generate smoother torque profile with reduced ripple.

FIG. 12 shows radial force density in the middle of the airgap as a function of rotor position for hybrid switched reluctance motor 1210 and radial force density in the middle of the airgap as a function of rotor position for comparative switched reluctance motor 1220. Although radial force generates no torque, its variation over time causes vibration in the motor and noise. According to FIG. 12, the radial force density in the new motor is smoother causing less stress on the motor.

Further study on a prototype of a preferred embodiment of the hybrid switched reluctance motor has illustrated the effectiveness of the new design in reduction of radial and tangential vibration of the motor in addition to a reduction in torque pulsation. Using an accelerometer with a bandwidth of 5 kHz the axial, tangential, and radial vibration of the hybrid switched reluctance motor were measured. The same test was performed on a conventional switched reluctance motor. The switched reluctance motor had the exact same stator, excitation and airgap length. The only difference between the two prototypes was the shape of the rotor, as previously described. A comparative reduction of tangential and radial accelerations and the torque pulsation are shown in FIGS. 13A through 13B.

Figure 13A:
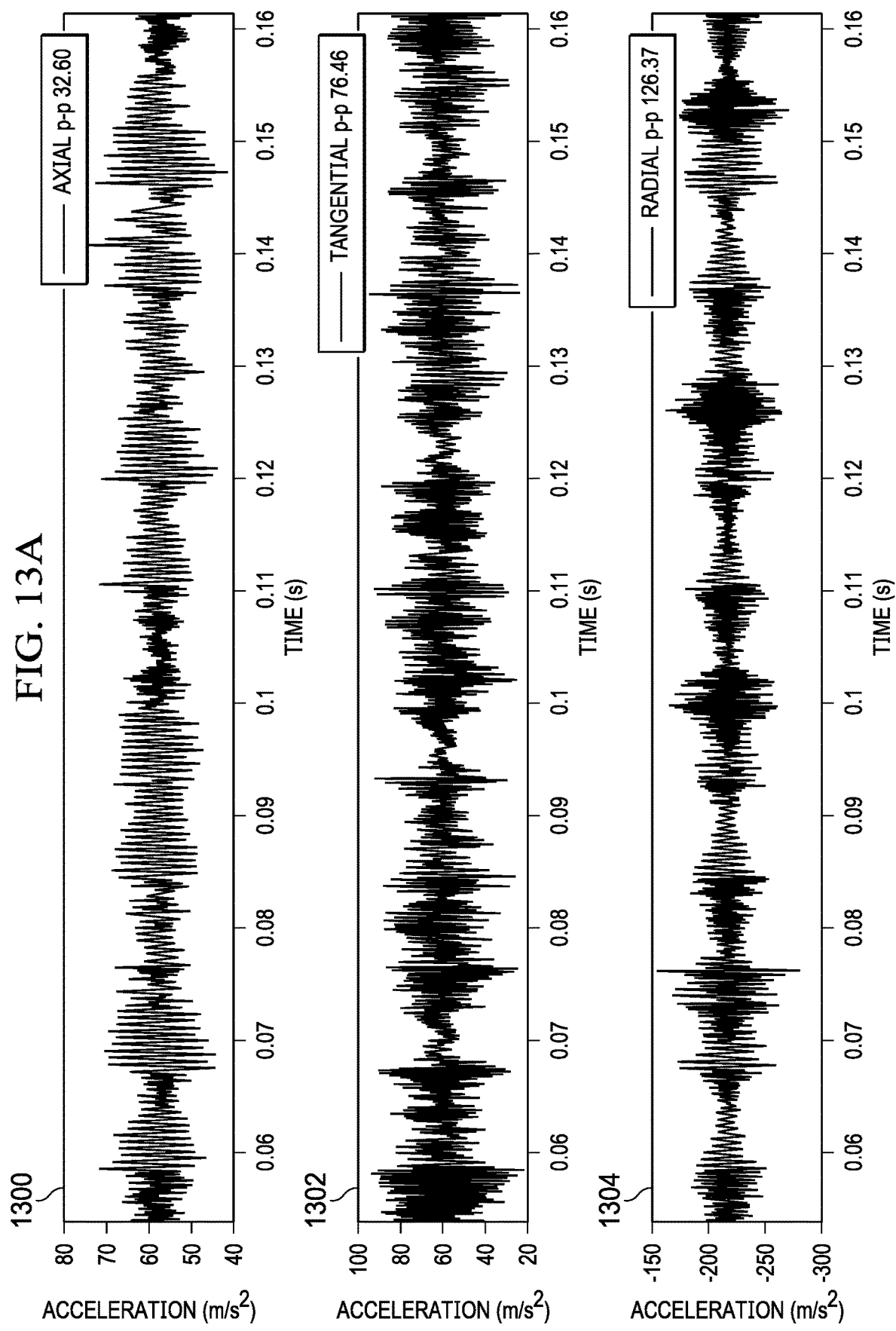
FIG. 13A is a graph showing the axial, tangential, and radial vibrations as a function of accelerations for a switched reluctance motor.

Referring then to FIG. 13A, the axial, tangential, and radial accelerations measured from an oscilloscope connected to a switched reluctance, as disclosed, motor running at 227 rpm are shown. Axial waveform 1300 for the switched reluctance motor shows an average peak-to-peak acceleration of 32.60 m/s$^2$. Tangential waveform 1302 for the switched reluctance motor shows an average peak-to-peak acceleration of 76.46 m/s$^2$. Radial waveform 1304 for the switched reluctance motor shows an average peak-to-peak acceleration of 126.37 m/s$^2$.

Referring then to FIG. 13B, the torque profile of the switched reluctance motor, as disclosed, running at 227 rpm taken from an inline torquemeter is shown. Torque waveform 1306 for the switched reluctance motor shows an average torque of 8.21 N·m and torque pulsation of 7.86 N·m. The torque pulsation, measured (peak-to-peak), is 95.72% of the torque. A fast Fourier transform (FFT) of the torque bandwidth per frequency is shown in plot 1310.

Referring then to FIG. 14A, the axial, tangential, and radial accelerations measured from an oscilloscope connected to a hybrid switched reluctance motor, as disclosed, running at 227 rpm are shown. Axial waveform 1400 for the hybrid switched reluctance motor shows an average peak-to-peak acceleration of 33.13 m/s$^2$. Tangential waveform 1402 for the hybrid switched reluctance motor shows an average peak-to-peak acceleration of 69.16 m/s$^2$. Radial waveform 1404 for the switched reluctance motor shows an average peak-to-peak acceleration of 91.16 m/s$^2$.

Referring then to FIG. 14B, the torque profile of the hybrid switched reluctance motor running at 227 rpm taken from an inline torquemeter is shown. Torque waveform 1406 for the hybrid switched reluctance motor shows an average torque of 8.62 N·m and torque pulsation of 3.66 N·m. The torque pulsation, measured (peak-to-peak), is 42.51% of the torque. A fast Fourier transform (FFT) of the torque bandwidth per frequency is shown in plot 1410.

A summary of the test results is shown in table 6 below.

TABLE 6

| Design | Speed (rpm) | Axial (m/s$^2$) | Axial (m/s$^2$) | Axial (m/s$^2$) | Average Torque (N · m) | Pulsations (N · m) | Peak Noise (dB) |
| --- | --- | --- | --- | --- | --- | --- | --- |
| Switched Reluctance Motor | 227 | 32.6 | 76.46 | 126.37 | 8.21 | 7.86 | 73.26 |
| Hybrid Switched Reluctance Motor | 227 | 33.13 | 69.16 | 91.16 | 8.62 | 3.66 | 70.23 |

As can be seen, substantial reduction in the tangential and radial vibration of the stators has been achieved. This is due to reduction of radial forces during turn-off and smoothing of the tangential forces when rotor and stator poles overlap. Reduction of radial and tangential vibration in the stator frame results in mitigation of torque pulsation without sacrificing torque. Furthermore, the acoustic noise is reduced as a result of the reduction of tangential and radial vibrations and pulse.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

The invention claimed is:

1. A switched reluctance motor comprising:
a stator, having a plurality of stator poles;
a rotor, having a plurality of rotor poles and a plurality of interpole segments located between the plurality of rotor poles;
wherein each interpole segment of the plurality of interpole segments further comprises a concave void radially aligned with an arcuate flux barrier;
wherein the arcuate flux barrier comprises an inner arcuate flux barrier and an outer arcuate flux barrier;
wherein the inner arcuate flux barrier further comprises a first inner arcuate surface and a first outer arcuate surface, wherein the outer arcuate flux barrier further comprises a second inner arcuate surface and a second outer arcuate surface and wherein the concave void is bounded by an exterior arcuate surface;
wherein the first inner arcuate surface, the first outer arcuate surface, the second inner arcuate surface, the second outer arcuate surface and the exterior arcuate surface are defined by an equation:

$$r(\theta) = \left(\frac{D_{shaft}}{2}\right) \cdot \sqrt[p]{\frac{C + \sqrt{C^2 + 4 \cdot \sin^2(p \cdot \theta)}}{2 \cdot \sin(p \cdot \theta)}}$$

where:
p is a machine pole pair number;
$D_{shaft}$ is a shaft diameter;
r is a radius;
θ is an angle in polar coordinates; and
C is a constant value for a center line of the rotor;
the exterior arcuate surface has a first set of parameter values:
$\theta_1$=0.38-1.18 radians; and
$C_1$=9.1975;
the second outer arcuate surface has a second set of parameter values:
$\theta_2$=0.37-1.2 radians; and
$C_2$=8.6794;
the second inner arcuate surface has a third set of parameter values:
$\theta_3$=0.32-1.25 radians; and
$C_3$=6.5448;

the first outer arcuate surface has a fourth set of parameter values:
$\theta_4$=0.29-1.28 radians; and
$C_4$=5.9532; and
the first inner arcuate surface has a fifth set of parameter values:
$\theta_5$=0.28-1.3 radians; and
$C_5$=4.7081.

2. A switched reluctance motor comprising:
a stator, having a plurality of stator poles;
a rotor, having a plurality of rotor poles and a plurality of interpole segments located between the plurality of rotor poles;
wherein each interpole segment, of the plurality of interpole segments, further comprises a concave void radially aligned with an arcuate flux barrier;
wherein the arcuate flux barrier comprises an inner arcuate flux barrier and an outer arcuate flux barrier;
wherein the inner arcuate flux barrier further comprises a first inner arcuate surface and a first outer arcuate surface, wherein the outer arcuate flux barrier further comprises a second inner arcuate surface and a second outer arcuate surface and wherein the concave void is bounded by an exterior arcuate surface;
wherein the concave void is defined by a first width, the outer arcuate flux barrier is defined by a second width and the inner arcuate flux barrier is defined by a third width; and
wherein the first width is greater than the second width; wherein the second width is greater than the third width.

3. The switched reluctance motor of claim 2, wherein each interpole segment of the plurality of interpole segments further comprises a first iron rib adjacent the concave void and the outer arcuate flux barrier and a second iron rib adjacent the outer arcuate flux barrier and the inner arcuate flux barrier.

4. The switched reluctance motor of claim 3, wherein the first iron rib defines a first width, the second iron rib defines a second width, and the first width is less than the second width.

5. The switched reluctance motor of claim 2, wherein the rotor further comprises:
a first bridge between the exterior arcuate surface and the outer arcuate flux barrier; and;
a second bridge between the outer arcuate flux barrier and the inner arcuate flux barrier.

6. The switched reluctance motor of claim 5, wherein the first bridge defines a first width, the second bridge defines a second width, and the first width is less than the second width.

7. A switched reluctance motor comprising:
a stator, having a plurality of stator poles;
a rotor, having a plurality of rotor poles and a plurality of interpole segments located between the plurality of rotor poles;
wherein each interpole segment of the plurality of interpole segments further comprises a concave void radially aligned with an arcuate flux barrier;
wherein the arcuate flux barrier comprises an inner arcuate flux barrier and an outer arcuate flux barrier; and
wherein the inner arcuate flux barrier further comprises a first inner arcuate surface and a first outer arcuate surface, wherein the outer arcuate flux barrier further comprises a second inner arcuate surface and a second outer arcuate surface and wherein the concave void is bounded by an exterior arcuate surface;

wherein the inner arcuate flux barrier further comprises a first curved end surface diametrically opposed to a second curved end surface.

8. The switched reluctance motor of claim 7, wherein the outer arcuate flux barrier further comprises a third curved end surface diametrically opposed to a fourth curved end surface.

9. The switched reluctance motor of claim 8, wherein the first curved end surface, the second curved end surface, the third curved end surface, and the fourth curved end surface are each defined by an equation:

$$Y_i(x)=a_i+b_i x+c_i x^2+d_i x^3$$

where:
x is a variable for the equation;
i=1, 2 . . . n−1; and
a, b, c and d are constants.

10. The switched reluctance motor of claim 9, wherein the first curved end surface is defined by the parameters:
$x_1$ range=33.22-36.35;
$i_1$=1;
$a_1$=−0.0002101e4;
$b_1$=0.0166657e4;
$c_1$=−0.4440131e4; and
$d_1$=3.9378229e4;
the second curved end surface is defined by the parameters:
$x_2$ range=37.1-41.05;
i=2;
$a_2$=−0.0000445e4;
$b_2$=0.0041933e4;
$c_2$=−0.1348427e4; and
$d_2$=1.4225928e4;
the third curved end surface is defined by the parameters:
$x_3$ range=33.22-36.35;
i=3;
$a_3$=0.0002101e4;
$b_3$=−0.0166657e4;
$c_3$=0.4440131e4; and
$d_3$=−3.9378229e4; and
the fourth curved end surface is defined by the parameters:
$x_4$=37.1-41.05;
$a_4$=0.0000445e4;
$b_4$=−0.0041933e4;
$c_4$=0.1348427e4; and
$d_4$=−1.4225928e4.

11. The switched reluctance motor of claim 8, wherein the first curved end surface and the second curved end surface define a first cut length, and the third curved end surface and the fourth curved end surface define a second cut length.

12. The switched reluctance motor of claim 11, wherein the first cut length is greater than the second cut length.

13. The switched reluctance motor of claim 1:
wherein the stator is comprised of M19 steel;
wherein the rotor is comprised of M19 steel.

* * * * *